US012745076B2

(12) United States Patent
Rafferty et al.

(10) Patent No.: US 12,745,076 B2
(45) Date of Patent: Sep. 22, 2026

(54) METHODS AND ARRANGEMENTS FOR USER AUTHENTICATION

(71) Applicant: Capital One Services, LLC, McLean, VA (US)

(72) Inventors: Galen Rafferty, Mahomet, IL (US); Christopher Wallace, San Francisco, CA (US); Samuel Sharpe, Cambridge, MA (US); Grant Eden, San Francisco, CA (US); Jeremy Edward Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 229 days.

(21) Appl. No.: 18/141,824

(22) Filed: May 1, 2023

(65) Prior Publication Data

US 2024/0373216 A1 Nov. 7, 2024

(51) Int. Cl.
*H04W 12/06* (2021.01)
*H04W 12/63* (2021.01)

(52) U.S. Cl.
CPC ........... *H04W 12/06* (2013.01); *H04W 12/63* (2021.01)

(58) Field of Classification Search
CPC ....... H04W 12/06; H04W 12/63; G06F 21/30; H04L 9/32
See application file for complete search history.

(56) References Cited

U.S. PATENT DOCUMENTS

| | | | | |
|---|---|---|---|---|
| 11,411,839 | B1 * | 8/2022 | Sandhu | H04L 41/5064 |
| 11,929,997 | B2 * | 3/2024 | Briceno | H04W 12/06 |
| 2015/0382263 | A1 * | 12/2015 | Jain | H04L 67/52 455/432.1 |
| 2018/0196936 | A1 * | 7/2018 | Arunkumar | H04L 63/08 |
| 2022/0292169 | A1 * | 9/2022 | Rose | H04L 63/1425 |
| 2023/0073410 | A1 * | 3/2023 | Tussy | G06F 21/32 |
| 2023/0171285 | A1 * | 6/2023 | Summers | H04L 63/102 726/2 |

* cited by examiner

*Primary Examiner* — Esther B. Henderson
(74) *Attorney, Agent, or Firm* — KDW Firm, PLLC

(57) ABSTRACT

Logic may receive one or more heatmaps captured by one or more user devices associated with a user, wherein each of the one or more heatmaps include data related to wireless communications. The logic may store the one or more heatmaps in a heatmap data structure associated with a user profile for the user. The logic may receive a login attempt with a heatmap, the login attempt associated with the user. The logic may generate a score for the login attempt by comparing the heatmap with the one or more heatmaps stored in a heatmap data structure associated with the user profile for the user. And, in some embodiments, the logic may determine to authenticate the login attempt based on the score.

20 Claims, 8 Drawing Sheets

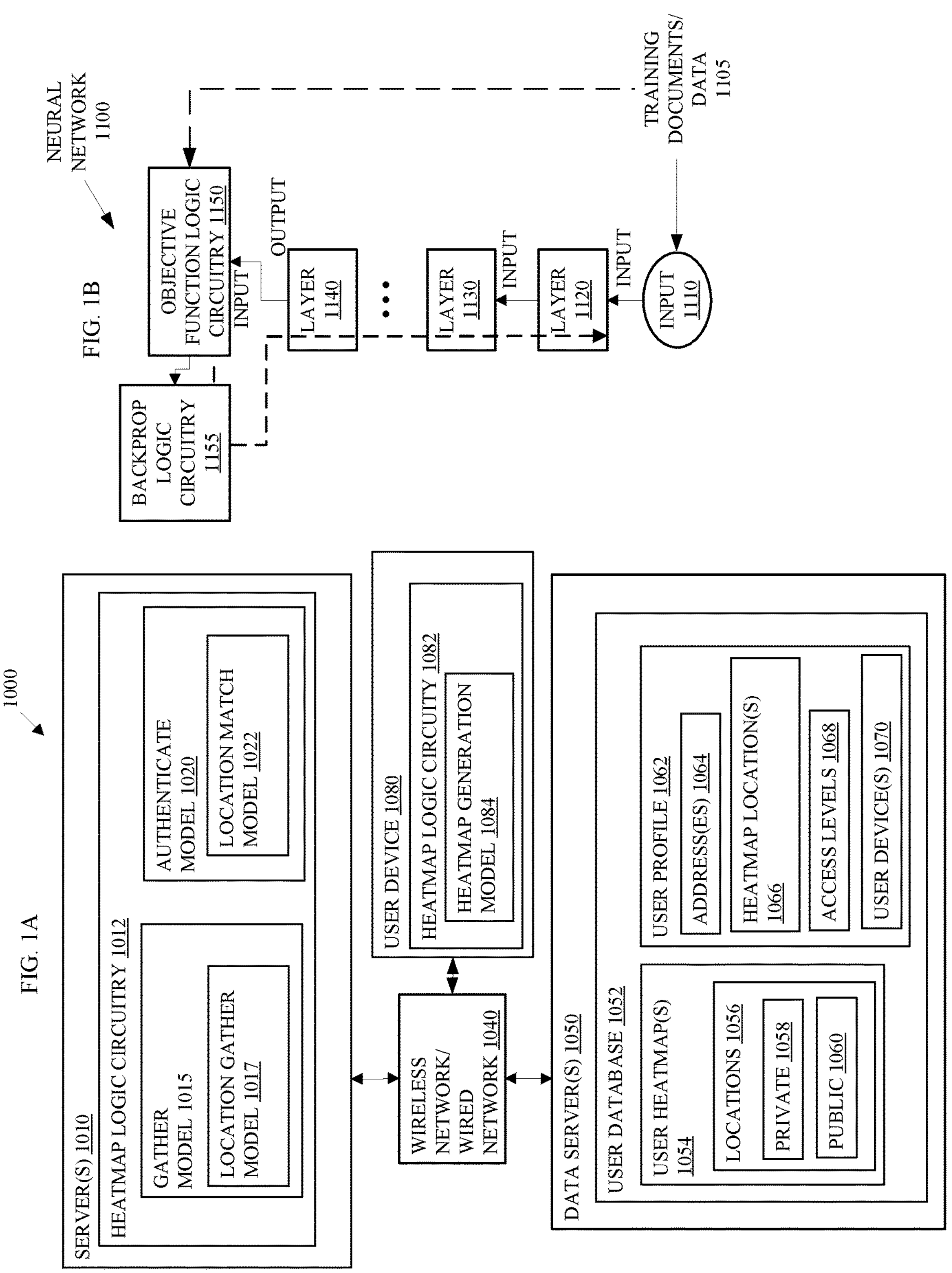
FIG. 1A
1000
SERVER(S) 1010
HEATMAP LOGIC CIRCUITRY 1012
GATHER MODEL 1015
LOCATION GATHER MODEL 1017
AUTHENTICATE MODEL 1020
LOCATION MATCH MODEL 1022
WIRELESS NETWORK/ WIRED NETWORK 1040
USER DEVICE 1080
HEATMAP LOGIC CIRCUITRY 1082
HEATMAP GENERATION MODEL 1084
DATA SERVER(S) 1050
USER DATABASE 1052
USER HEATMAP(S) 1054
LOCATIONS 1056
PRIVATE 1058
PUBLIC 1060
USER PROFILE 1062
ADDRESS(ES) 1064
HEATMAP LOCATION(S) 1066
ACCESS LEVELS 1068
USER DEVICE(S) 1070
FIG. 1B
NEURAL NETWORK 1100
OBJECTIVE FUNCTION LOGIC CIRCUITRY 1150
BACKPROP LOGIC CIRCUITRY 1155
INPUT
OUTPUT
LAYER 1140
LAYER 1130
INPUT
LAYER 1120
INPUT
INPUT 1110
TRAINING DOCUMENTS/ DATA 1105

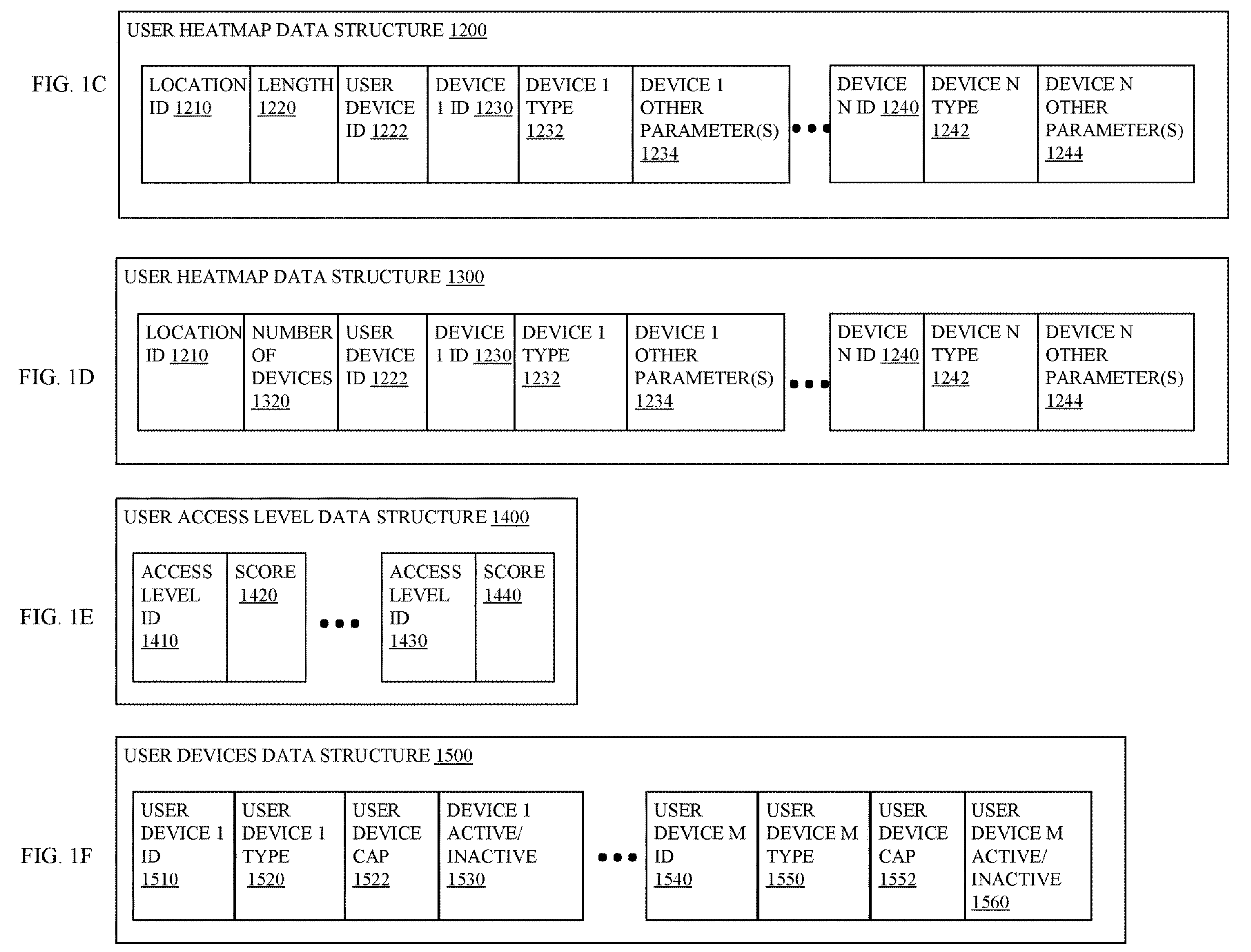
USER HEATMAP DATA STRUCTURE 1200
LOCATION ID 1210
LENGTH 1220
USER DEVICE ID 1222
DEVICE 1 ID 1230
DEVICE 1 TYPE 1232
DEVICE 1 OTHER PARAMETER(S) 1234
DEVICE N ID 1240
DEVICE N TYPE 1242
DEVICE N OTHER PARAMETER(S) 1244
FIG. 1C
USER HEATMAP DATA STRUCTURE 1300
LOCATION ID 1210
NUMBER OF DEVICES 1320
USER DEVICE ID 1222
DEVICE 1 ID 1230
DEVICE 1 TYPE 1232
DEVICE 1 OTHER PARAMETER(S) 1234
DEVICE N ID 1240
DEVICE N TYPE 1242
DEVICE N OTHER PARAMETER(S) 1244
FIG. 1D
USER ACCESS LEVEL DATA STRUCTURE 1400
ACCESS LEVEL ID 1410
SCORE 1420
ACCESS LEVEL ID 1430
SCORE 1440
FIG. 1E
USER DEVICES DATA STRUCTURE 1500
USER DEVICE 1 ID 1510
USER DEVICE 1 TYPE 1520
USER DEVICE CAP 1522
DEVICE 1 ACTIVE/ INACTIVE 1530
USER DEVICE M ID 1540
USER DEVICE M TYPE 1550
USER DEVICE CAP 1552
USER DEVICE M ACTIVE/ INACTIVE 1560
FIG. 1F 4000
MOTHERBOARD 4005
PROCESSOR 4010
MEMORY 4012
IMC 4014
REGISTERS 4016
P-P 4018
PROCESSOR CORE(S) 4020
HEATMAP LOGIC CIRCUITRY 4026
P-P 4052
4056
PROCESSOR 4030
P-P 4038
REGISTERS 4036
IMC 4034
MEMORY 4032
PROCESSOR CORE(S) 4040
P-P 4054
4057
4058
GRAPHICS CARD 4065
DEEP LEARNING ACCELERATOR 4067
CHIPSET 4060
I/F 4066
I/F 4068
P-P 4062
P-P 4064
I/F 4070
TPM 4072
UEFI, BIOS, FLASH 4074
BUS 4081
BUS BRIDGE 4080
COMM DEVICES 4086
DATA STORAGE 4088
HEATMAP LOGIC CIR 4096
AUDIO I/O 4090
I/O DEVICES 4092
BUS 4091
KEYBOARD 4082
MOUSE 4084

COMPUTING PLATFORM 6000

PROCESSING COMPONENT 6010

APPARATUS 6015

STORAGE MEDIUM 6020

OTHER PLATFORM COMPONENTS 6025

COMMUNICATIONS INTERFACE 6030

METHODS AND ARRANGEMENTS FOR USER AUTHENTICATION

TECHNICAL FIELD

Embodiments described herein are in the field of user authentication. More particularly, the embodiments relate to methods and arrangements to authenticate a user based on heatmaps such as signal heatmaps associated with one or more user locations.

BACKGROUND

As the impact of the Internet continues to alter the economic landscape, companies are experiencing a fundamental shift in how they do business. Business processes involve complex interactions between companies and their users such as customers, suppliers, partners, and employees. For example, businesses interact with customers to access accounts, open accounts, create electronic access for accounts, make payments, download statements, add or update profile information, apply for other accounts, and/or the like. Businesses must also make a wide array of information and services available to customers for generating further interactions.

To effectively migrate their complex interactions to an Internet-based E-business environment, organizations must contend with a wide array of challenges and issues. For example, businesses need to securely provide access to business applications and content to users they deem authorized. Often, this involves various system-specific authentication and/or authorization schemes.

Prior to authorizing a user to access a resource, access management systems may authenticate a user by verifying the identity of the user. Typically, verification of the identity of a user may involve the use of a username and password. Some systems may include additional verification steps.

Unfortunately, devices can be lost or stolen and/or usernames and passwords can be captured via various means. Thus, there is a need for additional authentication techniques that may provide evidence of the identity of the user without significantly burdening or inconveniencing the user in the implementation of the authentication.

SUMMARY

Embodiments may include various types of subject matter such as methods, apparatuses, systems, storage media, and/or the like. One embodiment may include an apparatus comprising: memory; and logic circuitry coupled with the memory. In some embodiments, the logic circuitry may receive one or more heatmaps captured by one or more user devices associated with a user, wherein each of the one or more heatmaps include data related to wireless communications. The logic circuitry may store the one or more heatmaps in a heatmap data structure associated with a user profile for the user. The logic circuitry may receive a login attempt with a heatmap, the login attempt associated with the user. The logic circuitry may generate a score for the login attempt by comparison of the heatmap with the one or more heatmaps stored in the heatmap data structure associated with the user profile for the user. And, in some embodiments, the logic circuitry may determine to authenticate the login attempt based on the score.

Another embodiment may comprise a non-transitory storage medium containing instructions, which when executed by a processor, cause the processor to perform operations.

The operations may receive a first heatmap from a user device associated with a user, wherein the first heatmap includes data related to wireless communications. The operations may store the first heatmap in a heatmap data structure associated with a user profile for the user. The operations may receive a login attempt with a second heatmap, the login attempt associated with the user. The operations may correlate the second heatmap with the first heatmap stored in the heatmap data structure associated with the user profile for the user to generate a score for the login attempt. And, in some embodiments, the operations may authenticate the login attempt based on the score.

Yet another embodiment may comprise a method. The method may perform operations via a processor. The method may comprise receiving one or more heatmaps captured by one or more user devices associated with a user, wherein each of the one or more heatmaps include data related to wireless communications. The processor may comprise storing the one or more heatmaps in a heatmap data structure associated with a user profile for the user. The processor may comprise receiving a login attempt with a heatmap, the login attempt associated with the user. The processor may comprise generating a score for the login attempt by comparison of the heatmap with the one or more heatmaps stored in the heatmap data structure associated with the user profile for the user. And, in some embodiments, the processor may comprise determining to authenticate the login attempt based on the score.

BRIEF DESCRIPTION OF THE DRAWINGS

FIG. 1A depicts an embodiment of a system including servers, networks, data servers, and software applications to determine a heatmap and authenticate a user via the heatmap;

FIG. 1B depicts an embodiment of a system to train a machine learning engine to determine a heatmap and authenticate a user via the heatmap;

FIG. 1C depicts an embodiment of a data structure to determination of a heatmap for a user;

FIG. 1D depicts an embodiment of a data structure to store a heatmap for a user;

FIG. 1E depicts an embodiment of a data structure to associate access levels associated with user authentication based on heatmap scores;

FIG. 1F depicts an embodiment of a data structure to associate user devices with a user for authentication via heatmaps;

DETAILED DESCRIPTION OF EMBODIMENTS

Figure 2A:
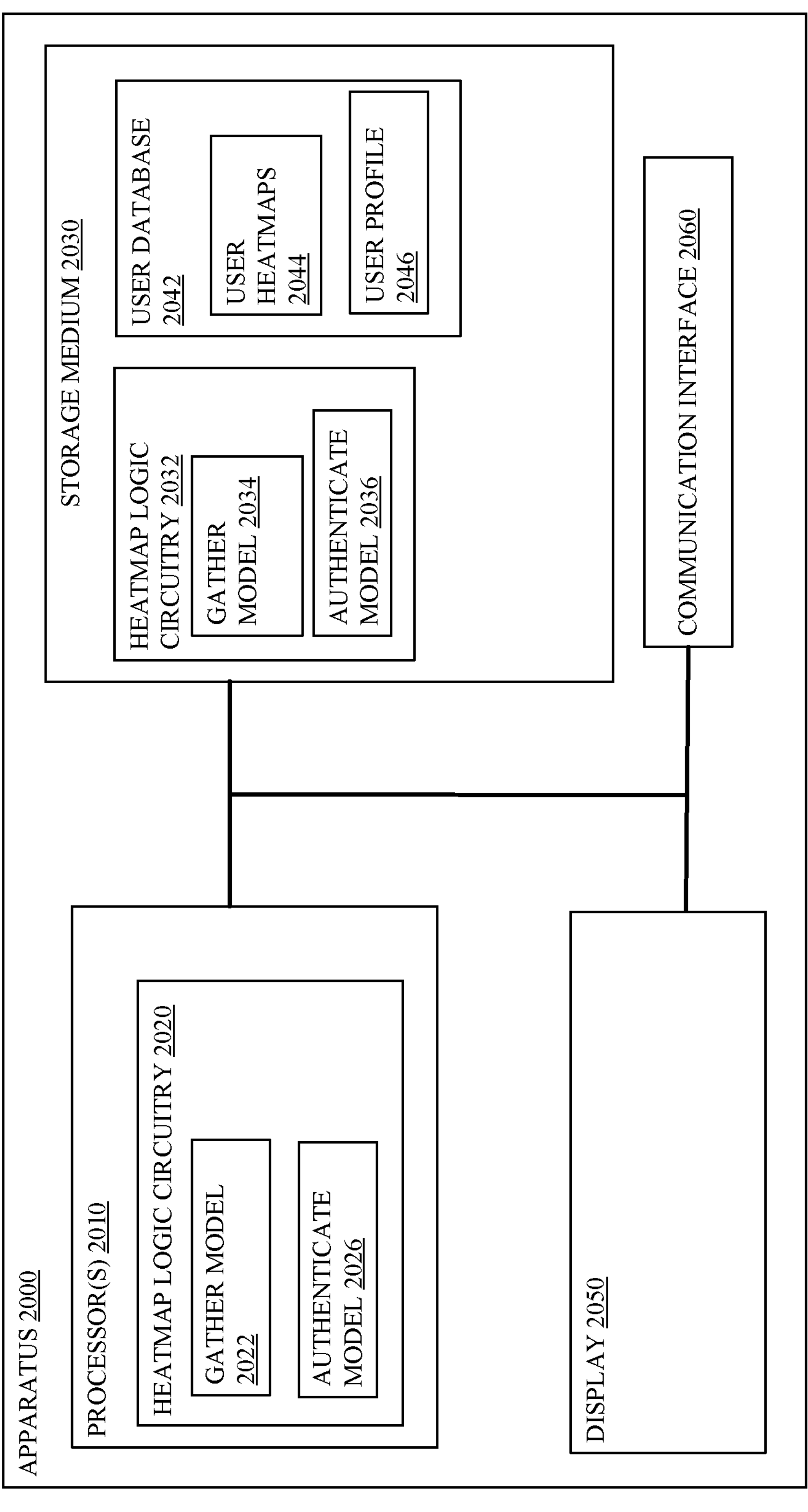
FIG. 2A depicts an embodiment of an apparatus with heatmap logic circuitry, such as the heatmap logic circuitry shown in server(s) 1010 illustrated in FIG. 1A.

The following is a detailed description of embodiments depicted in the drawings. The detailed description covers all modifications, equivalents, and alternatives falling within the appended claims.

Embodiments may address technical problems related to authenticating a user. Some embodiments may address technical problems related to determining a level of access to grant a user based on login credentials and other factors such as factors related to the environment of a location from which the user attempts to log into a system. Some embodiments may address technical problems related to increasing the level of confidence in a user's identity based on factors that minimally impact the user's login experience. Some embodiments may address technical problems related to passively or actively creating a fingerprint, which may be referred to herein as a heatmap, to increase confidence in the user's identity and authorization to log into a system such as a customer's bank account, a customer's credit card account, an employee account, a supplier's account, a business account, and/or the like.

A heatmap may comprise a set of identifiable resources in an environment at the location of the customer. Heatmap logic circuitry of a computer on which the customer may attempt to log into an account may generate a heatmap for the environment of the location. In some embodiments, the heatmap may comprise an identification for each device that is identifiable resource through passive and/or active means by the computer in the environment. In some embodiments, the environment may include a set of wireless network resources. In some embodiments, the environment may include a set of physically connected devices or wired devices. In some embodiments, the environment may include identifications for devices indirectly connected to the customer's computer.

For instance, for an environment of a home location, a heatmap may include a set of MAC addresses for each Wi-Fi device connected to a laptop that the customer might use to log into an account. The set of MAC addresses may include identifiers for a tablet, a watch, and a smart phone that the customer tends to have in proximity wherever the customer is when the customer may attempt to log into an account. In some embodiments, the environment of the home location may all devices from which the laptop may passively receive identifiers such as a television, a wireless router, a wireless printer, a stereo, wireless speakers, a refrigerator, a washer and dryer, a dishwasher, a mouse, an external keyboard, and/or the like and other network resources that are wired or wirelessly connected to the laptop. The heatmap logic circuitry of the laptop may collect MAC addresses for each of the wireless resources and IP addresses for each of the wired resources at the home location to generate a heatmap.

In some embodiments, the environment may include all devices from which the customer's laptop may actively receive identifiers. In some embodiments, the heatmap logic circuitry of the laptop may collect additional information about each resources to include in the heatmap. In such embodiments, the heatmap logic circuitry of the laptop may collect any of or all information available for resources identified in the heatmap such as a manufacturer, a serial number, a manufacture date, and/or the like.

Embodiments discussed herein can advantageously improve the technology for authenticating a user based on identification and verification of user locations from which a user logs into a system. Embodiments may advantageously improve the technology for authenticating a user by generation or creation of one or more heatmaps at each location from which a user may log into the system. Some embodiments may advantageously improve the technology for authenticating a user by generation or creation of one or more heatmaps at each location from which a user may log into the system via an app on a user device configured to access the system. Some embodiments may advantageously improve the technology for authenticating a user by generation or creation of one or more heatmaps at each location from which a user may log into the system via instructions or commands sent to an app on a user device.

Some embodiments may advantageously improve the technology for authenticating a user by storage of one or more heatmaps at each location from which a user may log into the system in a user database within or accessible by the system. Some embodiments may advantageously improve the technology for authenticating a user by access of one or more heatmaps for each location from which a user may log into the system from a user database within or accessible by the system. Some embodiments may advantageously improve the technology for authenticating a user by comparison or correlation of one or more heatmaps for each location from which a user may log into the system from a user database against a heatmap generated by the user device at the time the user attempts to log into the system.

Some embodiments may advantageously improve the technology for authenticating a user by scoring a heatmap generated by the user device at the time the user attempts to log into the system based on a known heatmap for the location. Some embodiments may advantageously improve the technology for authenticating a user by scoring a heatmap generated by the user device at the time the user attempts to log into the system based on a known heatmap for the location to determine a value (score) that indicates a probability that the current user location is a location from which the user has previously identified.

Some embodiments may advantageously improve the technology for authenticating a user by determining that a user location is a private user location. Some embodiments may advantageously improve the technology for authenticating a user by determining that a user location is a public user location. Some embodiments may advantageously improve the technology for authenticating a user by determining a level of access or authorization for access to the system based on the score.

Embodiments may comprise heatmap logic circuitry to interact with a user via a user device to generate one or more heatmaps for each location from which a user expects to login to the system. For instance, a user may log into the system via one or more different user devices. The heatmap logic circuitry of the system may include server-side heatmap logic circuitry and user device-side heatmap logic circuitry to interact with the user to generate heatmaps. The user device-side heatmap logic circuitry may comprise an app that the user installs on the user device that includes code to use hardware of the user device to perform operations of heatmap logic circuitry via the user device. In other embodiments, the user device-side heatmap logic circuitry may comprise a generic app such as a web browser that receives commands or code from the server-side heatmap logic circuitry to perform operations of heatmap logic circuitry via the user device.

The heatmap logic circuitry on the user device may interact with the server-side heatmap logic circuitry to perform operations such as generation or creation of the one or more heatmaps and to transmit or cause transmission of the one or more heatmaps to the server-side heatmap logic circuitry for storage in a user database within or accessible to the server-side heatmap logic circuitry. In many embodiments, the heatmaps may include a list of network devices detectable by the user device at each user location. For instance, the user device may passively or actively collect or identify network devices detectable by the user device such as a set of network devices that are part of a private network that a user associated with at a user location. In some embodiments, the set of network devices may include all devices that publicly advertise capabilities, services, device identifiers (IDs), and/or the like at the user location.

In some embodiments, the scope of the set of network devices captured by the heatmap logic circuitry may depend on whether the user identifies the user location as a private user location or a public user location. For instance, in a private user location, all devices that publicly advertise capabilities, services, device identifiers (IDs), and/or the like at the user location may be captured for the creation of a heatmap at that user location. In other embodiments, the heatmap logic circuitry may capture network devices that are associated with the user device or that are connected to or associated with the network devices that are associated with the user device.

For public locations, the heatmap logic circuitry may capture network devices that are associated with the user device. Devices associated with the user device may include devices with which the user device pairs, or otherwise forms a logical connection with by, e.g., logging into the device or logging into a network that has a logical association with the device.

To illustrate, a user device may be a smart phone. While at a public location, the user may also have a smart watch that has a logical connection with the smart phone, a laptop that has a logical connection with the smart phone, a headset that logically or physically connects with the smart phone, a mouse that wirelessly connects with the laptop, a tablet that logically connects with the smart phone, a car with, e.g., a stereo that logically or physically connects with the smart phone, and the car stereo may be physically connected with a microphone, and/or the like. The heatmap logic circuitry may passively detect communications between the smart phone and the smart watch, laptop, headset, tablet, and car stereo. In some embodiments, the heatmap logic circuitry may also capture from the communications, the connection of the laptop with the wireless mouse and the connection of the microphone with the car stereo.

At the same public location, the heatmap logic circuitry may identify one or more public access points that advertise services and capabilities periodically via beacon frames and one or more other Wi-Fi and/or Bluetooth devices nearby that transmit and/or receive communications wirelessly. In some embodiments, the heatmap logic circuitry may capture device IDs for all the devices identified in the communications via device IDs at public locations. In some embodiments, the heatmap logic circuitry may restrict the creation of a heatmap to a set of network devices directly connected to the smart phone via physical or logical connections or associations. In some embodiments, the heatmap logic circuitry may restrict the creation of a heatmap to a set of network devices directly connected to the smart phone via physical or logical connections or associations as well as network devices connected logically or physically with the network devices that are directly connected to the smart phone such as the mouse connected to the laptop and the microphone connected to the car stereo.

In some embodiments, the heatmap logic circuitry may create one or more heatmaps for a single user location. For instance, the heatmap logic circuitry may generate multiple heatmaps for the user location after requesting a user move around the location to capture sets of networks devices detectable at each capture site at the user location. For situations in which the user location is "home", for instance, the user may capture separate heatmaps in the living room, kitchen, study, den, dining room, patio, garage, game room, bedroom, and/or the like, because some network devices may not be available at certain locations within the "home" location and the signal strengths and quality indicators may vary from room to room. In some embodiments, the heatmap logic circuitry on the user device may combine the heatmaps into a single consolidated heatmap prior to sending the heatmap to the server-side heatmap logic circuitry for storage in a user database. In other embodiments, each distinct heatmap for the user location "home" may be sent to the server-side heatmap logic circuitry for storage in the user database. In such embodiments, the heatmap logic circuitry may compare heatmaps during login events to each of or some of the heatmaps for the user location "home" to determine scores for the one of the heatmaps. In such embodiments, the heatmap logic circuitry may consider one or more of the multiple scores for authentication of the user during the login event.

In further embodiments, after authenticating the user login attempt with a heatmap provided with user credentials, the heatmap logic circuitry may store the heatmap received from the user for the user location in the user database for subsequent comparison against heatmaps submitted for login attempts from the same user location. In such embodiments, the heatmap logic circuitry may capture multiple heatmaps for the same user location without a requirement to interact with the user to obtain multiple heatmaps for the same user location.

As the set of network devices are being captured from a user location or thereafter, the heatmap logic circuitry at the user device-side may determine parameters for the heatmap. In many embodiments, the types of parameters captured for the heatmaps may be predetermined. For instance, in some embodiments, the parameters may include device IDs for each of the network devices such as medium access control (MAC) addresses, radio IDs, and names associated with the network IDs such as "home router", "home gateway", "Bluetooth headset", "smart television", "car stereo", "company router", "company VPN", "company phone", "smart watch", and/or the like. In some embodiments, the parameters may include additional information captured from the communications such as specifications, capabilities such as bandwidth capabilities, communication intervals, network names such as basic service set identifiers (BSSIDs), network IDs such as service set identifiers (SSIDs), neighbor reports, Wi-Fi protocol versions, Bluetooth specification versions, carrier frequencies, and/or the like.

In some embodiments, the heatmap logic circuitry of the user device may also include as a parameter, an indication for the user location of a heatmap to describe the user location as a public location or a private location. A private location may comprise, for instance, a user's home location, a user's business location, and/or the like, where the numbers and types of network devices may remain relatively constant for the majority, if not all, the network devices. A public location may comprise a location such as a public library, a coffee shop, a restaurant, a department store, an airport, a seaport, a bus station, a train station, and/or the like, where the numbers and types of detectable network devices may vary significantly with exception of the network devices with which the user device periodically associates such as network devices of public networks and/or network devices carried or worn by the user.

After determining the parameters for the heatmap, the heatmap logic circuitry may generate one or more frames with the heatmap in, e.g., a frame body, or payload, of the one or more frames for transmission to the heatmap logic circuitry of a server of the system. After or during the generation of the one or more frames, the heatmap logic circuitry on the user device may transmit or cause transmission of the one or more frames to the heatmap logic circuitry of the server and the heatmap logic circuitry of the server may store the heatmap in a user database for future reference.

The heatmap logic circuitry of the server may receive one or more heatmaps for one or more user locations associated with a user and may store the heatmaps in data structures of a user heatmap in the user database. In some embodiments, the heatmap logic circuitry of the server may also add flags for each of the locations into a user profile so that the user may enable, disable, and/or remove locations for which heatmaps are stored in the user database.

During a login attempt by the user, the heatmap logic circuitry of the user device may generate a heatmap and send the heatmap to the heatmap logic circuitry of the server. The heatmap logic circuitry of the server may determine the location of the user based on the heatmap, which may include GPS coordinates, a triangulated location from a cellular service, a location of a cellular communications tower, an IP address, and/or the like; or by requesting that the user identify the location. The heatmap logic circuitry of the server may then compare or correlate the heatmap received from the user device in conjunction with the login attempt with heatmaps maintained in the user database for the user location. In many embodiments, the heatmap logic circuitry of the server may generate a score for the heatmap received for the login attempt based on the comparison or correlation that includes a value indicative of the probability that the heatmap is from the location, a value indicative of the similarities between the heatmap received and a heatmap stored in the user database, and/or a value indicative of differences between the heatmap received and a heatmap stored in the user database. In some embodiments, where multiple heatmaps are stored for the location in the user database, the heatmap logic circuitry of the server may generate multiple scores.

After generation of one or more scores associated with the user login attempt, the heatmap logic circuitry of the server may determine whether to authenticate the user login attempt based on login credentials provided by the user, the one or more scores, and optionally other factors related to the user login attempt. Other factors may include, but are not limited to, for example, a time frame between a login attempt at a user's "home" location and a login attempt at a user's public location, where the user's public location is known to be too distant from the user's home location to be initiated by the same user within the time period. An Internet protocol address associated with the user's home location and a user's public location may provide an indication of the distance between the locations or the user device may provide geographical coordinates of the geographical area of the user's home location and the geographical area of the user's public location.

In some embodiments, the one or more scores may provide a measure of confidence in the identity of the user attempting to login into the system. In such embodiments, the heatmap logic circuitry of the server may determine whether or not to authenticate the user login attempt based on the one or more scores or may determine a level of access to grant to the user to the system based on the one or more scores. If the one or more scores offer a low measure of confidence, further authentication measures may be required before the user is granted access to the system, the user login attempt may fail, or the user login attempt may offer a low level of access to the system.

Several embodiments comprise systems with multiple processor cores such as central servers, modems, routers, switches, servers, workstations, netbooks, mobile devices (Laptop, Smart Phone, Tablet, and the like), and the like. In various embodiments, these systems relate to specific applications such as healthcare, home, commercial office and retail, security, industrial automation and monitoring applications, financial services, and the like.

Turning now to the drawings, FIGS. 1A-1F depict embodiments of systems including servers, networks, and data servers, other computers, machine learning engines, data structures, and applications to determine a heatmap and/or authenticate a user via the heatmap. FIG. 1A illustrates an embodiment of a system 1000. The system 1000 may represent a portion of at least one wireless or wired network 1040 that interconnects server(s) 1010 with data server(s) 1050. The at least one wireless or wired network 1040 may represent any type of network or communications medium that can interconnect the server(s) 1010 and the data server(s) 1050, such as a cellular service, a cellular data service, satellite service, other wireless communication networks, fiber optic services, other land-based services, and/or the like, along with supporting equipment such as hubs, routers, switches, amplifiers, and/or the like.

In the present embodiment, the server(s) 1010 may represent one or more servers owned and/or operated by a company that provides services. In some embodiments, the server(s) 1010 represent more than one company that provides services provided via heatmap logic circuitry 1012. For example, a first set of one or more server(s) 1010 may provide services including a gather model 1015 to determine a heatmap via a user device 1080. The heatmap logic circuitry 1012 may establish an agreement and preferences for the user to implement the heatmap logic circuitry 1012 and 1082 to determine a heatmap via the gather model 1015 and/or authenticate a user via the heatmap with the authenticate model 1020.

The gather model 1015 may determine a heatmap for a user location through interaction with the user and/or with background operations during login events with a user.

The heatmap for a user location may describe the environment of the user device 1080 used by the user for logging into the system 1000 based on detectable network devices by the user device 1080 at the user location. The user device 1080 may comprise heatmap logic circuitry 1082 that is a combination of hardware of the user device 1080 and code configured to operation in conjunction with the heatmap logic circuitry 1012 to generate one or more heatmaps at a user location for the purposes of generating the heatmaps for storage in user heatmaps(s) 1054 of a user database 1052 in the data server(s) 1050 and/or for the purpose of logging the user into the server(s) 1010 of the system 1000.

In some embodiments, the heatmap logic circuitry 1082 of the user device 1080 may comprise a dedicated app with code executing on a processor of the user device 1080 for generating heatmaps for use by the heatmap logic circuitry 1012. In other embodiments, the heatmap logic circuitry 1082 of the user device 1080 may comprise a generic app such as a web browser executing code and/or commands from the heatmap logic circuitry 1012 on a processor of the user device 1080 for generating heatmaps for use by the heatmap logic circuitry 1012.

To generate the heatmaps, the heatmap logic circuitry 1082 may comprise a heatmap generation model 1084. The heatmap generation model 1084 may comprise code to perform operations such as gathering information about network devices detectable by the user device 1080 via one or more networking and/or communication capabilities available to the user device 1080. In many embodiments, the code may be configured to gather device IDs for each of the network devices detected by the user device 1080 and, in some embodiments, the code may collect other heatmap parameters based on the category of network device and/or the type (functionality) of the network device. For instance, the code may collect a type of network, a frequency of a signal, a basic service set identifier (BSSID), a service set identifier (SSID), other advertisement information associated with a network identifier, or a combination thereof.

In some embodiments, the gather model 1015 may comprise a location gather model 1017 to actively or passively gather information indicative of a location of a user location such as the global positioning system (GPS) coordinates (e.g., from GPS circuitry in the user device 1082), a location of a nearest cell tower, a triangulation of a location based on multiple cell towers within range of the user device 1080, an Internet Protocol (IP) address associated with a network physically or logically connected to the user device 1080, a physical address provided by the user, a combination thereof, and/or the like. In some embodiments, the location gather model 1017 may gather multiple heatmaps for a location by interacting with a user of the user device 1080 to cause the user to move to one or more different capture sites proximate to or within the user location. At each of the capture sites, the heatmap logic circuitry 1082 may determine a set of network devices detectable and heatmap parameters for the set of network devices including network device IDs and, optionally, additional information related to the set of network devices.

In some embodiments, the location gather model 1017 may restrict the set of network devices to a subset of network devices detectable by the user device 1080. For instance, if the user indicates or the heatmap logic circuitry 1082 and/or the heatmap logic circuitry 1012 determines that the user location is a public location, the set of network devices may be limited to network devices having a logical or physical connection with the user device 1080. In some of such embodiments, the set of network devices may also include devices physically or logically associated with the network devices having a logical or physical connection with the user device 1080.

In some embodiments, the location gather model 1017 may passively gather heatmap parameters such as a set of network devices by snooping or monitoring wired or wireless communications accessible by the user device 1080. For instance, the user device 1080 may detect one or more communications to and/or from network devices and may parse the communications to determine network IDs of network devices associated with the communications. In some embodiments, the location gather model 1017 may also capture additional information such as capabilities from network communications such as capabilities, services, neighbor reports, and/or the like.

In some embodiments, the location gather model 1017 may actively gather heatmap parameters such as a set of network devices by transmitting probe requests to one or more network devices, to group addresses, and/or by broadcasting probe requests via wired or wireless communications media accessible by the user device 1080. For instance, the user device 1080 may transmit a probe requests or ping on the network to a router and/or to one or more IP addresses to obtain information about network devices, routing tables, beacon intervals, neighbor reports, capabilities, and/or the like to identify network IDs of network devices associated with the router.

A second set of one or more server(s) 1010 may include the authenticate model 1020 to authenticate an identity of user via the heatmap during a login event to the system 1000. In some embodiments, the authenticate model 1020 may correlate a heatmap received from a user during a login attempt to determine a score that may be a measure of confidence in the identity of the user. After receiving a heatmap from the user device 1080 in conjunction with a login attempt, a location match model 1022 of the authenticate model 1020 may determine a location of the user location such as the global positioning system (GPS) coordinates (e.g., from GPS circuitry in the user device 1082), a location of a nearest cell tower, a triangulation of a location based on multiple cell towers within range of the user device 1080, an Internet Protocol (IP) address associated with a network physically or logically connected to the user device 1080, a physical address provided by the user, a combination thereof, and/or the like. The location match model 1022 may compare the location with locations 1056 associated with heatmaps in the user heatmap(s) 1054 stored in data structures of the user database 1052 of the data server(s) 1050 to determine if the user heatmap(s) 1054 include one or more heatmaps associated with the user location.

If one or more of the heatmaps in the user heatmap(s) 1054 match the location identified for the user location, the authenticate model 1020 may compare or correlate the heatmap received from the user device 1080 for the login attempt with one or more heatmaps found in the user heatmap(s) 1054 to determine a score for one or more of the heatmaps found for the user location in the user heatmap(s) 1054. In some embodiments, the authenticate model 1020 may apply weights to the heatmap parameters in the determination of the value of the score to, e.g., reflect likely variations in the heatmap parameters, the measure of confidence offered by matching a particular heatmap parameter, and/or the like. For instance, the differences in a list of the network devices included in the heatmaps may have more weight than differences in the signal strength indicators, signal quality indicators, and the like. Furthermore, differences in a routing table captured for a network associated with a network device such as a router may have less weight than differences in a list of the network devices included in the heatmaps.

In some embodiments, the authenticate model 1020 may include a machine learning engine to generate the score. The machine learning model may be trained with heatmaps gathered from multiple users and user locations along with heatmaps that are determined to fail to match and/or heatmaps determined to match, such as the neural network 1100 shown in FIG. 1B. In some embodiments, the machine learning engine may be trained with heatmaps generated based on acceptable and/or expected variations in the heatmaps and/or heatmaps generated with unacceptable and/or unexpected variations in the heatmaps. In some embodiments, the machine learning engine may be trained with multiple sets of heatmaps captured at different times from user locations for multiple users. For example, a training set may include, for multiple user locations, heatmaps captured from one or more captured sites at each user location over a period of time such as one or more months, or one or more weeks.

Based on authenticated login credentials received from a user and the one or more scores generated, the authenticate model 1020 may determine to authenticate the login attempt by the user. In many embodiments, the correct login credentials are required for authentication. The one or more scores may, in some embodiments, be considered as secondary factors that may increase confidence in the identity of the user or decrease confidence in the identity of the user.

For instance, if the user presents correct login credentials and a heatmap that has a high enough score to be considered by the authenticate model 1020 to be, e.g., a 97% match, the confidence in the user identity is high unless security measures detract from the confidence level. With a high confidence level, the user may be authenticated for access to the server(s) 1010 and, in some embodiments, may gain full access to services offered via authentication by the server(s) 1010. On the other hand, if the login credentials are correct but the score of the heatmap is low such as 30%, the authenticate model 1020 may fail the login attempt, may require additional security measures to provide access to the user, or may authenticate the user with the lowest level of access to services offered via authentication by the server(s) 1010.

The access levels 1068 in the user profile 1062 of the user database 1052 may define two or more levels of access as well as requirements to gain such levels of access and may reside in a data structure such as the user access level data structure 1400 shown in FIG. 1E. For instance, the access levels 1068 may define a low level of access for scores above 30% and 50% and below, a medium level of access for scores above 50% and below 90%, and a high level of access for scores above 90%. In such embodiments, a score below 30% may fail. In other embodiments, the score levels may be different such as a failure for scores below 50%, a low-level access for scores between 50% and 70%, a medium level of access for scores above 70% and below 95%, and a high level of access for scores above 95%. In some embodiments, to achieve a high level of access, the user must meet additional security factors.

In some embodiments, the scores may be augmented by other security factors that cause the score levels to increase or decrease for the same levels of access. For instance, provision of a token in lieu of or in addition to the login credentials may increase the level of confidence in the identity of the user and reduce the scores required for obtaining authorization to one or more of the levels of access.

The data server(s) 1050 may comprise the user database 1052. The user database may comprise one or more different types of data structures for storing data about a user such as user heatmap(s) 1054 and a user profile 1062. The user heatmap(s) 1054 may store heatmaps generated or created by heatmap logic circuitry 1012 and/or 1082 for each user location from which the user does or expects to log into the server(s) 1010. The user heatmap(s) 1054 may comprise heatmaps for multiple locations 1056 and each of the locations 1056 may optionally be marked as private 1058 or public 1060 locations. In some embodiments, the user heatmap(s) 1054 may reside in data structures such as the user heatmap data structure 1300 shown in FIG. 1D.

The user profile 1062 may comprise information about the user as well as user preferences in relation to building heatmaps such as a flag comprising one or more bits to indicate whether to build the heatmaps in the background or to actively interact with the user to identify user locations and to generate heatmaps for storage in the user heatmap(s) 1054. In other embodiments, the process for building the heatmaps for the user is set int eh code and is not a user preference. The user profile 1062 may comprise one or more address(es) 1064, heatmap location(s) 1066, access levels 1068, and user device(s) 1070. The one or more address(es) 1064 may include a home address, a work address, and/or one or more other addresses. The location gather model 1017 of the heatmap logic circuitry 1012 may access the address(es) 1064 to identify a location as a "home" user location, a "work" location, or other location. In some embodiments, if not specified by the user, other locations that are not verifiable via the address(es) 1064 may be assumed to be public addresses by the location gather model 1017 of the heatmap logic circuitry 1012.

The heatmap location(s) 1066 may comprise or be associated with locations for each of the user locations 1056 represented in the user heatmap(s) 1054 and may include one or more flags to identify whether the location is public or private and one or more flags that the user may use to enable, disable, add, and/or remove locations for user heatmap(s) 1054. For instance, upon initiating the use of user heatmap(s) 1054, the user may list names for locations in the heatmap location(s) 1066. After adding a location, the user may be prompted at login attempts to associate the name of the location with the corresponding one or more heatmaps.

The user device(s) 1070 may comprise user devices used by the user for login attempts to the server(s) and may reside in a data structure such as the user devices data structure 1500 shown in FIG. IF. In some embodiments, the user may identify one or more user devices and interact with the heatmap logic circuitry 1012 to provide information about the user devices such as networking and communication capabilities. The heatmap logic circuitry 1012 may factor in the capabilities of the user devices for the purposes of generating scores for the heatmaps provided by the user with the user device. In some embodiments, the heatmap logic circuitry 1012 may filter out portions of the heatmap based on capabilities. For example, the user may generate a heatmap for a "home" location with a smart phone and then attempt to log into the server(s) 1010 via a desktop computer. In some embodiments, the desktop computer may not have access to the network via the wireless router used by the smart phone and may not connect to some network devices such as a smart watch and earphones. As such, the heatmap generated by the desktop computer may not include some of the network devices in the heatmap stored in user heatmap(s) 1054. The heatmap logic circuitry 1012 may consider the capabilities of the desktop computer, compare the capabilities with the set of network devices in the heatmap generated by the smart phone, and may adjust scoring of the heatmap generated by the desktop computer to account for the different capabilities of the desktop computer. In some embodiments, the heatmap logic circuitry 1012 may filter the heatmap generated by the smart phone based on capabilities of the desktop computer prior to comparison or correlation with the heatmap generated by the smart phone. In some embodiments, the heatmap logic circuitry 1012 may treat the user location as a new user location for the purposes of logging into the server(s) 1010 via the desktop computer and may generate a heatmap with the desktop computer to store in the user heatmap(s) 1054. In some embodiments, after authenticating the user login attempt from the desktop computer, the heatmap logic circuitry 1012 may interact with an application executing on the desktop computer to generate one or more heatmaps by the desktop computer and include, in the one or more heatmaps, an identifier for the user device that created the heatmaps such as the heatmap data structures 1200 and 1300 shown in FIGS. 1C and 1D, respectively.

FIG. 1B generally describes a way to train a machine learning engine or model such as a neural network (NN) 1100 with supervision (supervised learning). The NN 1100 may comprise a deep neural network (DNN).

A DNN is a class of artificial neural network with a cascade of multiple layers that use the output from the previous layer as input. An example of a DNN is a recurrent neural network (RNN) where connections between nodes form a directed graph along a sequence. A feedforward neural network is a neural network in which the output of each layer is the input of a subsequent layer in the neural network rather than having a recursive loop at each layer.

Another example of a DNN is a convolutional neural network (CNN). A CNN is a class of deep, feed-forward artificial neural networks. A CNN may comprise an input layer and an output layer, as well as multiple hidden layers. The hidden layers of a CNN typically consist of convolutional layers, setting layers, fully connected layers, and normalization layers.

The NN 1100 comprises an input layer 1110, and three or more layers 1120 and 1130 through 1140. The input layer 1110 may comprise input data including training data training documents/data 1105, such as the heatmaps in the user heatmap(s) 1054 shown in FIG. 1A, to train the authenticate model 1020 to perform functionality discussed herein. The input layer 1110 may provide the data in the form of tensor data to the layer 1120. The tensor data may include a vector, matrix, or the like with values associated with each input feature of the NN 1100.

In many embodiments, the input layer 1110 is not modified by backpropagation. The layer 1120 may compute an output and pass the output to the layer 1130. Layer 1130 may determine an output based on the input from layer 1120 and pass the output to the next layer and so on until the layer 1140 receives the output of the second to last layer in the NN 1100. Depending on the methodology of the NN 1100, each layer may include input functions, activation functions, and/or other functions as well as weights and biases assigned to each of the input features. The weights and biases may be randomly selected or defined for the initial state of a new model and may be adjusted through training via backwards propagation (also referred to as backpropagation or backprop). When retraining a model with, e.g., with additional training data obtained after an initial training of the model, such as user heatmaps for a specific user, the weights and biases may have values related to the previous training and may be adjusted through retraining via backwards propagation.

The layer 1140 may generate an output, such as a probability or classification, and pass the output to an objective function logic circuitry 1150. The objective function logic circuitry 1150 may determine errors in the output from the layer 1140 based on an objective function such as a comparison of the predicted or classification results against the expected results from the training documents/data 1105. For instance, the expected results may be paired with the input in the training data supplied for the NN 1100 for supervised training. In some embodiments, the NN 1100 may represent a machine learning engine to generate, during operation in inference mode, a score for a heatmap received for a user login attempt.

During the training mode, the objective function logic circuitry 1150 may output errors to backpropagation logic circuitry 1155 to backpropagate the errors through the NN 1100. For instance, the objective function logic circuitry 1150 may output the errors in the form of a gradient of the objective function with respect to the input features of the NN 1100.

The backpropagation logic circuitry 1155 may propagate the gradient of the objective function from the top-most layer, layer 1140, to the bottom-most layer, layer 1120 using the chain rule. The chain rule is a formula for computing the derivative of the composition of two or more functions. That is, if f and g are functions, then the chain rule expresses the derivative of their composition $f \circ g$ (the function which maps x to f(g(x))) in terms of the derivatives of f and g. After the objective function logic circuitry 1150 computes the errors, backpropagation logic circuitry 1155 backpropagates the errors. The backpropagation is illustrated with the dashed arrows.

When operating in inference mode, the authenticate model 1020 may receive feedback such as a negative customer experience for rejection of a login attempt at a known user location based on a heatmap in the user heatmap(s) 1054 show in FIG. 1A. If the feedback is negative, the backpropagation may attribute an error to the output. If the feedback is positive, such as an express or implied success in rejection of a login attempt or authorization of a login attempt, the backpropagation may reinforce or bias selection of the output within the layers of the NN 1100.

FIG. 1C depicts an embodiment of a user heatmap data structure 1200 for determination of a heatmap for a user such as the heatmaps determined via the heatmap generation model 1084 of the heatmap logic circuitry 1082 in FIG. 1A. The user heatmap data structure 1200 may comprise a location ID 1210, a length 1220, a user device ID 1222, and a set of one or more network devices numbered 1 through N including device 1 ID 1230, device 1 type 1232, and device 1 other parameter(s) 1234, through device N ID 1240, device N type 1242, and device N other parameter(s) 1244. The location ID 1210 may comprise one value or may comprise a set of two or more subfields with one or more values indicative of the location at which the heatmap is generated by a user device such as the user device 1080 in FIG. 1A. The location may include values such as an IP address associated with a network at the location, GPS coordinates for the location, coordinates based on triangulation by a cellular system for the location, an indicator associating the location with an address that is present in the user profile such as the address(es) 1064 in the user profile 1062 in FIG. 1A, a name provided for the address by the user, and/or the like.

The length 1220 may comprise a value indicative of the length of the user heatmap data structure 1200 such as the length of the remaining fields in the user heatmap data structure 1200, the length of the variable number of device 1 through device N fields, the length of the entire user heatmap data structure 1200, and/or the like. In some embodiments, the length 1220 field may include a value indicating the number of devices in the set of network devices.

The user device ID 1222 field may include a value of a device ID for the user device that generated the heatmap such as the device ID of the user device 1080 shown in FIG. 1A. The user device ID 1222 may include one value such as a MAC address of the user device or may include two or more subfields that comprise one or more values. For instance, the user device ID 1222 field may include values such as such as the MAC address of the user device (full, truncated, or compressed), a model number, a model name, a serial number, a manufacture, an OS version, a wireless protocol version, a Wi-Fi address, a Bluetooth address, an NFC nodule ID such as a support equipment item description (SEID), a subscriber identity module (SIM) card ID such as an embedded identification document (EID), an international mobile equipment identity (IMEI), an integrated circuit card identification number (ICCD), a mobile equipment identifier (MEID), an IMEI2 for an embedded SIM (eSIM), and/or the like.

The device 1 through device N parameters may include a device ID (1230 through 1240) that include one value or two or more subfields with values such as a MAC address of the user device (full, truncated, or compressed), a model number, a model name, a serial number, a manufacture, an OS version, a wireless protocol version, a Wi-Fi address, a Bluetooth address, an NFC nodule ID such as a support equipment item description (SEID), a subscriber identity module (SIM) card ID such as an embedded identification document (EID), an international mobile equipment identity (IMEI), an integrated circuit card identification number (ICCD), a mobile equipment identifier (MEID), an IMEI2 for an embedded SIM (eSIM), and/or the like.

The device type (1232 through 1242) that include one value or two or more subfields with values such as names or numbers indicative of the types of device such as a "smart phone", "watch", "printer", "scanner", "television", "laptop", "notebook", "mobile device", "ear phones", "microphone", "sensor", "network drive", "light switch", "wireless router", "IP router", "hub", "switch", "managed switch", "light", "light fixture", "air conditioner controller", "gateway", "wired device", wireless device", "other", and/or the like. In some embodiments, the heatmap logic circuitry 1012 and 1082 may maintain a table in memory associating numbers (numeric and/or alphanumeric) associated with each type of device and may include the number in the device type field or a subfield of the device type field.

The device other parameter(s) (1234 through 1244) may include one value or two or more subfields with values such as a received signal strength indicator (RSSI) value, a signal-to-noise ratio (SNR), a received signal-to-noise indicator (RSNI), a signal quality (SQ), a received channel power indicator (RCPI), a received power indicator (RPI), an average noise plus interference power (ANPI), and/or other value indicative of the strength and/or quality of the signal received wirelessly from a network device, a beacon interval, capability information, a service set identifier, an enhanced distributed channel access (EDCA) parameter set, a quality-of-service (QoS) capability, high throughput (HT) capabilities, very high throughput (VHT) capabilities, a mesh ID, a neighbor report indicative neighbor network devices, and/or the like.

FIG. 1D depicts an embodiment of a user heatmap data structure 1300 to store a heatmap for a user such as the data structures in user heatmap(s) 1054 illustrated in FIG. 1A. The user heatmap data structure 1300 may be created based on receipt of a user heatmap data structure 1200 from a user device such as the user device 1080 in FIG. 1A and may include the same field except that the length 1220 field may be replaced with a number of devices 1320 field. The number of devices 1320 field may include a value indicating the number of devices in the set of network devices device 1 through device N in fields 1230 through 1234.

FIG. 1E illustrates an embodiment of a user access level data structure 1400 to associate access levels associated with user authentication based on heatmap scores such as the access levels 1068 shown in FIG. 1A. The user access level data structure 1400 may comprise two or more access level IDs (1410 through 1430) and each of the access level IDs (1410 through 1430) may be associated with a score (1420 through 1440). Each access level ID (1410 through 1430) may include one value or two or more subfields with values such as an ID associated with an access level, a name associated with the access level (e.g., low, medium, and high or 1, 2, 3, 4, 5, etc.), one or more cryptographic keys associated with access of resources available to users authenticated for the access level, and/or the like.

FIG. 1F illustrates an embodiment of a user devices data structure 1500 to associate user devices with a user for authentication via heatmaps such as the user device 1080 in FIG. 1A. For instance, the heatmap logic circuitry 1012 may capture information about each user device that the user is using when logging into a server such as the server(s) 1010 in FIG. 1. The user devices data structure 1500 may reside in the user database 1052 such as the user devices 1070 shown in FIG. 1A. In some embodiments, the heatmap logic circuitry 1012 may request that the user indicate whether the device will be used again to log into the server. If so, the heatmap logic circuitry 1012 may, in some embodiments, capture information about each user device in the user devices data structure 1500 and may capture heatmaps for each user location from which the user logs into the server with these user devices either actively by through interaction with the user or passively as the user logs into the server with the user devices.

The user devices data structure 1500 may comprise a set of one or more user devices numbered 1 through M including user device 1 ID 1510, user device 1 type 1520, user device 1 capabilities 1522, and user device 1 active/inactive 1530, through user device M ID 1540, user device M type 1550, user device M capabilities 1552, and user device M active/inactive 1560.

The user device ID 1 through M (1510 through 1540) fields may each comprise one value or two or more subfields with values such as a MAC address of the user device (full, truncated, or compressed), a model number, a model name, a serial number, a manufacture, an OS version, a wireless protocol version, a Wi-Fi address, a Bluetooth address, an NFC nodule ID such as a support equipment item description (SEID), a subscriber identity module (SIM) card ID such as an embedded identification document (EID), an international mobile equipment identity (IMEI), an integrated circuit card identification number (ICCD), a mobile equipment identifier (MEID), an IMEI2 for an embedded SIM (eSIM), and/or the like.

The user device type 1 through M (1520 through 1550) fields may each comprise one value or two or more subfields with values such as "smart phone", "watch", "television", "laptop", "notebook", "mobile device", "stationary device", "desktop computer", "server", "wired device", "wireless device", and/or the like. The user device 1 through M capabilities (1522 through 1552) fields may each comprise one value or two or more subfields with values such as flags indicative of capabilities such as carrier frequencies 2.4 GHz (gigahertz), 5 GHZ, 6 GHZ, 45 GHz, 60 GHz, and/or one or more other carrier frequencies for wireless communications, single carrier (SC), IP protocols, Bluetooth protocols, 1 gigabits per second (Gps), 2 Gps, 10 Gps, 100 Gps, quality of service (QOS), short frames, compressed frames, spectrum management, channels, short slot times, radio measurement, mesh protocols, sub 1 GHz protocols, enhanced distributed channel access (EDCA), beamforming, high-throughput, tunneled direct-link setup (TDLS), security sockets, time-sensitive networking (TSN), peer-to-peer (P2P) protocols, security algorithms, modulation and coding schemes (MCSs), channel bandwidths, single in-single out (SISO), multiple-in-multiple out (MIMO), orthogonal frequency multiplexing (OFDM), orthogonal frequency multiple access (OFDMA), and/or the like.

The user device 1 through M active/inactive (1530 through 1560) fields may include one value such as flag indicative of whether a user device is active or inactive. For instance, the user may be able to set a preference as to whether the user device will be used to log into the server or will not be used to log into the server. In some embodiments, the user may have the option to remove the device from the user devices data structure 1500 after marking the user device as inactive or in lieu of marking the user device as inactive.

FIG. 2A depicts an embodiment of an apparatus with heatmap logic circuitry, such as the heatmap logic circuitry 1012 in server(s) 1010 illustrated in FIG. 1A. The apparatus 2000 may be a computer in the form of a smart phone, a tablet, a notebook, a desktop computer, a workstation, or a server. The apparatus 2000 can combine with any suitable embodiment of the systems, devices, and methods disclosed herein. The apparatus 2000 can include processor(s) 2010, a non-transitory storage medium 2030, communication interface 2060, and a display device 2050. The processor(s) 2010 may comprise one or more processors, such as a programmable processor (e.g., a central processing unit (CPU)). The processor(s) 2010 may comprise processing circuitry to implement heatmap logic circuitry 2020 such as the heatmap logic circuitry 1012 in FIG. 1A.

The processor(s) 2010 may operatively couple with a storage medium 2030. The storage medium 2030 may store logic, code, and/or program instructions executable by the processor(s) 2010 for performing one or more instructions including the heatmap logic circuitry 2032. The storage medium 2030 may comprise one or more memory units (e.g., removable media or external storage such as a secure digital (SD) card, random-access memory (RAM), a flash drive, a hard drive, and/or the like). The memory units of the non-transitory storage medium 2030 can store logic, code and/or program instructions executable by the processor(s) 2010 to perform any suitable embodiment of the methods described herein. For example, the processor(s) 2010 may execute instructions such as instructions of the heatmap logic circuitry 2032 causing one or more processors of the processor(s) 2010 represented by the heatmap logic circuitry 2020 to determine a heatmap and/or authenticate a user via the heatmap.

In many embodiments, the gather model 2022 of the heatmap logic circuitry 2020 may comprise part of or all code from the gather model 2034 in the heatmap logic circuitry 2032 during execution and code may be removed or added to the gather model 2022 as needed from the gather model 2034 to execute various operations of the heatmap logic circuitry 2032 via the processor(s) 2010. The gather model 2022 of the heatmap logic circuitry 2032 may interact with a user device, such as the user device 1080 in FIG. 1A, to receive one or more heatmaps captured by one or more user devices associated with a user. In some embodiments, each of the one or more heatmaps may include data related to wireless communications. For instance, the heatmaps may include one or more parameters associated with each device in the set of network devices such as a signal strength, a signal quality, and/or other parameters that increase the granularity of the description for each of the network devices.

After receiving the one or more heatmaps, the gather model 2022 may store the one or more heatmaps in a heatmap data structure associated with a user profile for the user in the user heatmaps 2044 of the user database 2042 in the storage medium 2030.

In many embodiments, the authenticate model 2026 of the heatmap logic circuitry 2020 may comprise part of or all code from the authenticate model 2036 in the heatmap logic circuitry 2032 during execution and code may be removed or added to the authenticate model 2036 as needed from the authenticate model 2036 to execute various operations of the heatmap logic circuitry 2032 via the processor(s) 2010. The authenticate model 2036 of the heatmap logic circuitry 2032 may interact with the user database 2042, such as the user database 1052 in FIG. 1A, to receive a login attempt with a heatmap, the login attempt associated with the user, and to generate a score for the login attempt by comparison of the heatmap with the one or more heatmaps stored in the heatmap data structure of the user heatmaps 2044 associated with the user profile 2046 for the user in the user database 2042.

After generating a score for the login attempt, the authenticate model 2026 may determine to authenticate the login attempt based on the score. In many embodiments, the authenticate model 2026 may consider multiple security factors in addition to the score to determine to authenticate the login attempt such as the provision of correct login credentials such as a username and password, a token, a combination thereof, and/or the like. In some embodiments, the score may be a secondary factor that may increase confidence in the identity of the user. In some embodiments, a score indicating that the heatmap does not match the heatmap for the same user location in the user database 2042 may detract from the confidence in the identity of the user even if the login credentials are correct.

The storage medium 2030 may be non-transitory and may store code and data for execution by the processor(s) 2010. The storage medium 2030 may comprise the heatmap logic circuitry logic circuitry 2032 and the customer database 2042, and/or the like. In many embodiments, the heatmap logic circuitry logic circuitry 2032 may include the gather model 2034 and the authenticate model 2036. In many embodiments, the user database 2042 may comprise the user heatmap(s) 2034 and the user profile 2046.

The processor(s) 2010 may couple to a communication interface 2060 to transmit and/or receive login credentials and heatmaps from a user device such as the user device 1080 in FIG. 1. The communication interface 2060 includes circuitry to transmit and receive communications through a wired and/or wireless media such as an Ethernet interface, a wireless fidelity (Wi-Fi) interface, a cellular data interface, and/or the like. In some embodiments, the communication interface 2060 may implement logic such as code in a baseband processor to interact with a physical layer device to transmit and receive wireless communications such as login credentials and heatmaps to the processor(s) 2010. For example, the communication interface 2030 may implement one or more of local area networks (LAN), wide area networks (WAN), infrared, radio, Wi-Fi, point-to-point (P2P) networks, telecommunication networks, cloud communication, and the like.

Figure 2B:
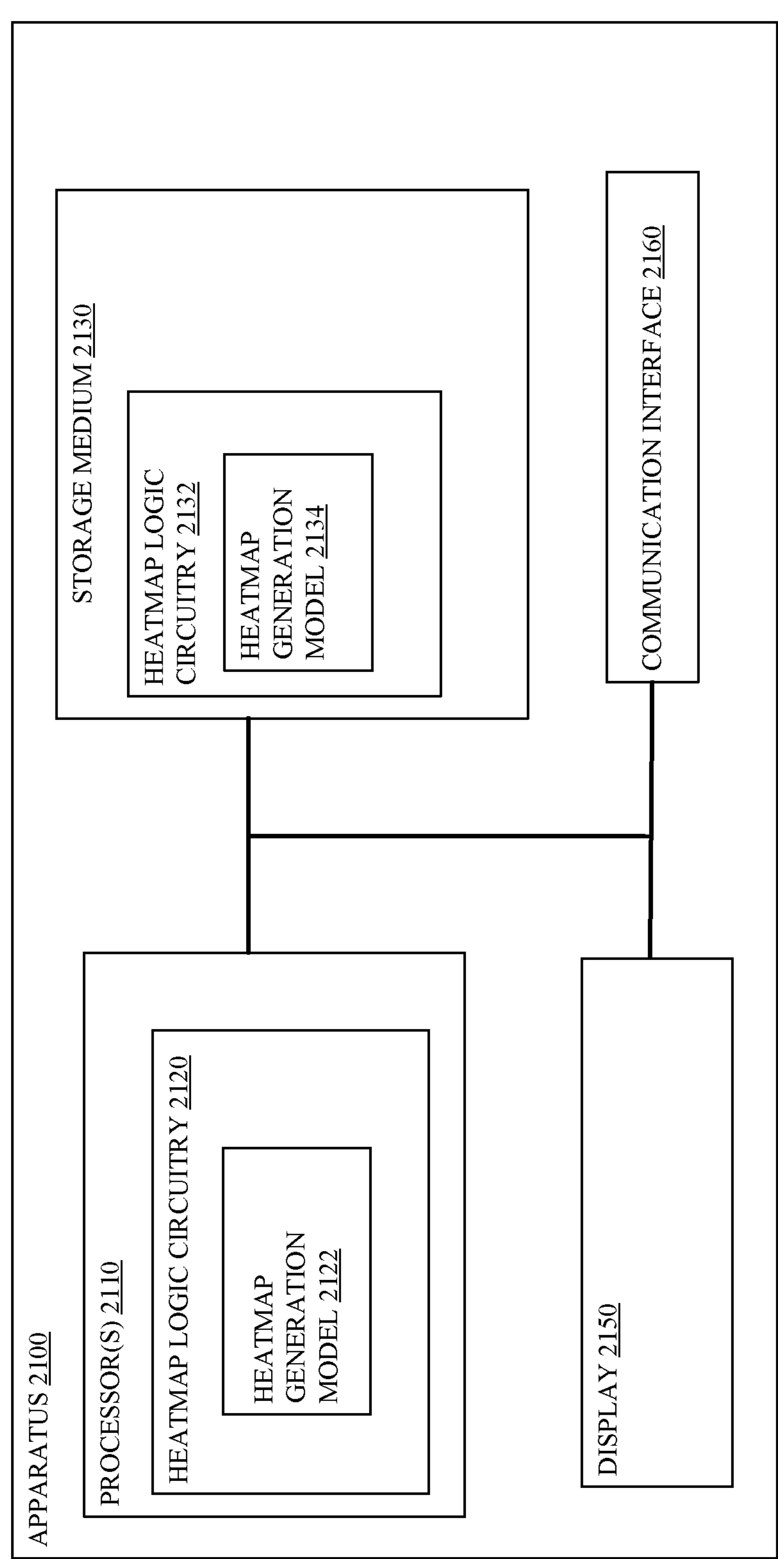
FIG. 2B depicts an embodiment of an apparatus with heatmap logic circuitry, such as the heatmap logic circuitry shown in user device 1080 illustrated in FIG. 1A.

FIG. 2B depicts an embodiment of an apparatus with heatmap logic circuitry, such as the heatmap logic circuitry 1082 in user device 1080 illustrated in FIG. 1A. The apparatus 2100 may be a computer in the form of a smart phone, a tablet, a notebook, a desktop computer, a workstation, or a server such as the user device 1080 in FIG. 1A. The apparatus 2100 can combine with any suitable embodiment of the systems, devices, and methods disclosed herein. The apparatus 2100 can include processor(s) 2110, a non-transitory storage medium 2130, communication interface 2160, and a display device 2150. The processor(s) 2110 may comprise one or more processors, such as a programmable processor (e.g., a central processing unit (CPU)). The processor(s) 2110 may comprise processing circuitry to implement heatmap logic circuitry 2120 such as the heatmap logic circuitry 1082 in FIG. 1A.

The processor(s) 2110 may operatively couple with a storage medium 2130. The storage medium 2130 may store logic, code, and/or program instructions executable by the processor(s) 2110 for performing one or more instructions including the heatmap logic circuitry 2132. The non-transitory storage medium 2130 may comprise one or more memory units (e.g., removable media or external storage such as a secure digital (SD) card, random-access memory (RAM), a flash drive, a hard drive, and/or the like). The memory units of the storage medium 2130 can store logic, code and/or program instructions executable by the processor(s) 2110 to perform any suitable embodiment of the methods described herein. For example, the processor(s) 2110 may execute instructions such as instructions of the heatmap logic circuitry 2132 causing one or more processors of the processor(s) 2110 represented by the heatmap logic circuitry 2120 to determine a heatmap for a user location.

In many embodiments, the heatmap logic circuitry 2120 may comprise part of or all code from the heatmap logic circuitry 2132 during execution and code may be removed or added to the heatmap logic circuitry 2120 as needed from the heatmap logic circuitry 2132 to execute various operations of the heatmap logic circuitry 2132 via the processor(s) 2110. The heatmap generation model 2122 of the heatmap logic circuitry 2120 may interact with communications interfaces of the apparatus 2100, such as the user device 1080 in FIG. 1A, to passively receive communications indicative of a set of devices and/or actively transmit one or more frames to request device information to generate a set of devices. In some embodiments, the heatmap generation model 2122 may determine one or more heatmap parameters including device IDs from communications such as wireless communications received at the apparatus 2100 and generate a frame comprising the set of network devices. For instance, the heatmaps may include one or more parameters associated with each device in the set of network devices such as a signal strength, a signal quality, and/or other parameters, which may vary within an expected margin of error. The heatmap logic circuitry of a server, such as the heatmap logic circuitry 1012 in FIG. 1A, may compensate or account for variations in the parameter values by adjustment of the threshold scores for authentication of the login attempt and/or for determination of an access level for authentication. Note that, in many embodiments, the heatmap parameters that the heatmap logic circuitry 2120 may collect for a detected network device may comprise a predetermined set of parameters that are not expected to vary significantly between login attempts by the user at user locations. Collection of additional parameters beyond the network device ID may, advantageously, increase the granularity of the description for each of the network devices, which may increase the level of confidence in a user identity after determination that heatmaps generated at the time of a login attempt match heatmaps stored in the user database for the user location(s).

After generating a frame comprising the set of devices detected by the heatmap logic circuitry 2120, the heatmap logic circuitry 2120 may transmit or cause the frame to be transmitted to the server via a communications interface 2160 of the apparatus 2100. For instance, the frame may comprise a MAC frame and the communications interface 2160 may generate a physical layer (PHY) preamble to transmit prior to transmission of the MAC frame in a PHY frame to the server such as the server(s) 1010 in FIG. 1A.

The storage medium 2130 may be non-transitory and may store code and data for execution by the processor(s) 2110. The storage medium 2130 may comprise the heatmap logic circuitry logic circuitry 2132 and the heatmap logic circuitry logic circuitry 2132 nay comprise the heatmap generation model 2134, and/or the like. In many embodiments, the heatmap generation model 2134 may comprise the code for execution by the processor(s) 2110.

The processor(s) 2110 may couple to a communication interface 2160 to transmit and/or receive login frames with heatmaps to build a database of heatmaps and/or to provide a heatmap in conjunction with a user login attempt at a user location. The communication interface 2160 may include circuitry to transmit and receive communications through a wired and/or wireless media such as an Ethernet interface, a wireless fidelity (Wi-Fi) interface, a cellular data interface, and/or the like. In some embodiments, the communication interface 2160 may implement logic such as code in a baseband processor to interact with a radio to transmit and receive wireless communications such as login credentials and heatmaps to the processor(s) 2110. For example, the communication interface 260 may include network interfaces to associate with one or more of local area networks (LAN), wide area networks (WAN), infrared, radio, Wi-Fi, point-to-point (P2P) networks, telecommunication networks, cloud communication, and the like.

Figure 3A:
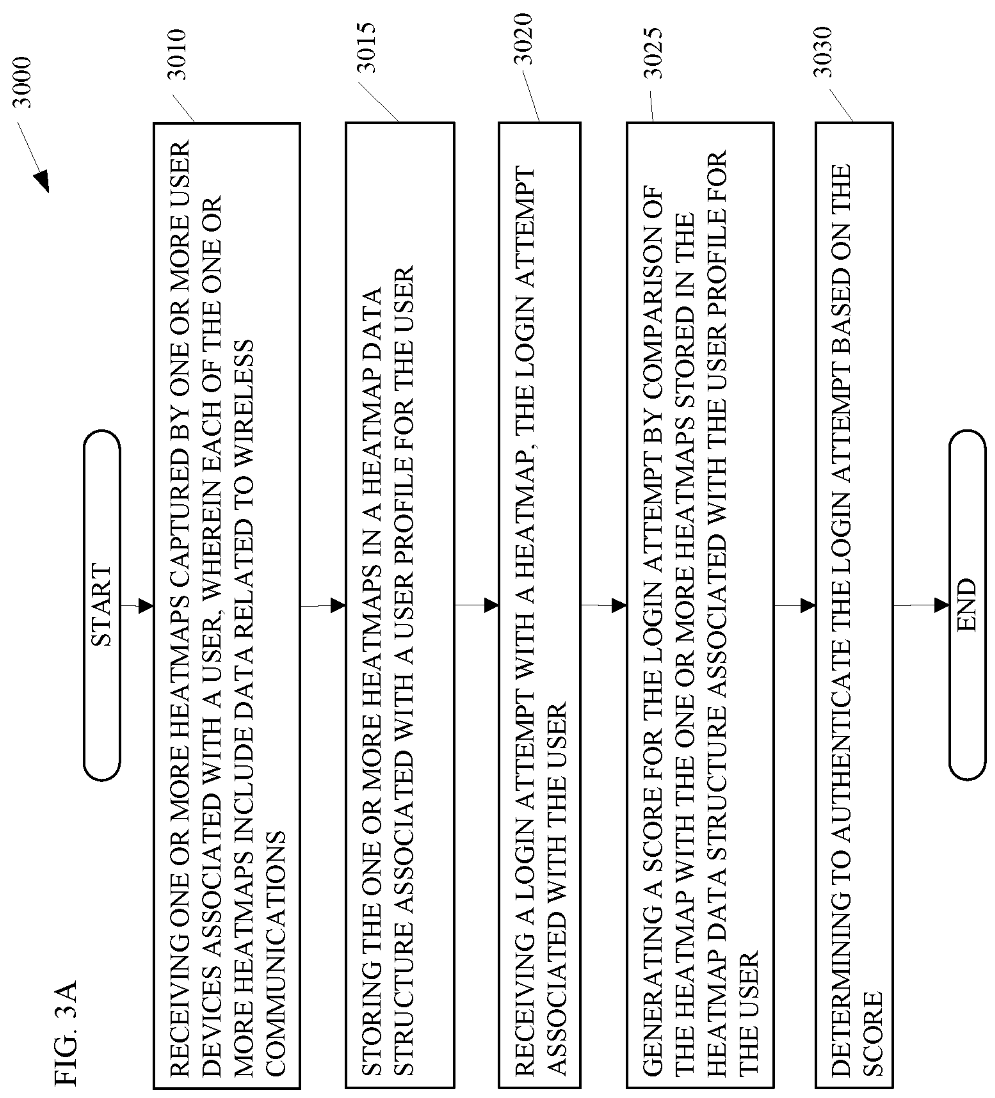
FIGS. 3A-B depict flowcharts of embodiments to determine a heatmap and authenticate a user via the heatmap, via heatmap logic circuitry, such as the heatmap logic circuitry shown in FIGS. 1A and 2A-B.
Figure 3B:
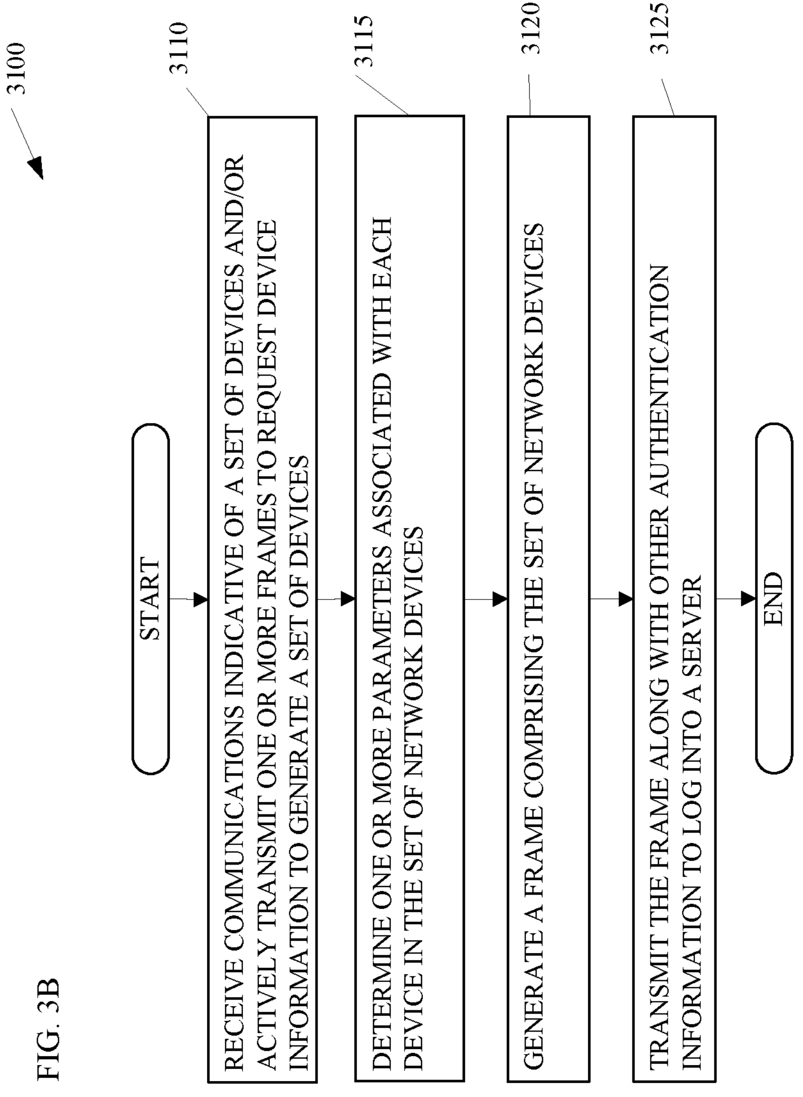

FIGS. 3A-3B depict flowcharts of embodiments of processes 3000 and 3100 to determine a heatmap and authenticate a user via the heatmap, via heatmap logic circuitry of a server, such as the heatmap logic circuitry shown in FIGS. 1A and 2A-B. FIG. 3A illustrates a flowchart of a process 3000 to authenticate a user via the heatmap. The process 3000 starts with receiving, by heatmap logic circuitry, one or more heatmaps captured by one or more user devices associated with a user, wherein each of the one or more heatmaps include data related to wireless communications (element 3010). For instance, a user may execute an app on a user device such as a computer or smart phone to log into an account via a network such as a private network or the Internet, via the server. In response to the request from the heatmap logic circuitry for login credentials, the user may provide login credentials such as a username and password, a token, a verification code sent via an out of band (OOB) system, and/or the like. The app may also include one or more heatmaps created for one or more user locations either with the login credentials or after the heatmap logic circuitry verifies the login credentials.

In some embodiments, the heatmap logic circuitry may, in response to a login attempt by the user, request that the app transmit a heatmap for the location from which the user is attempting to log into the server. For instance, the heatmap logic circuitry may access a user database to determine if the user has provided a heatmap for the location from which the user is logging into the server. In some embodiments, the app may respond with a communication to engage the user in a process of generating a heatmap and/or of identifying whether the location is a private location or a public location. In other embodiments, the app may automatically generate a heatmap for the location without engaging the user. For example, the user may have set a preference to perform the heatmap generation in the background for private and/or public locations from which the user logs into the server.

As an illustrative example, the user may log into the server of a bank at which the user maintains accounts such as checking accounts, savings accounts, and credit card accounts. The user may agree to the use of heatmaps for public and private locations from which the user may log into the server. The heatmap logic circuitry of the server or heatmap logic circuitry in an app installed on a user device used by the user may begin to collect heatmap data at each location from which the user logs into the server and store the heatmaps in a user database at the server or at a data server coupled with the server. For instance, the heatmap logic circuitry of the server may request that the app generate the heatmap data at the user's "home" location. For a stationary user device, the heatmap logic circuitry in an app may generate a heatmap based on a set t of network devices visible to the stationary user device at an instantaneous moment or over a period of time such as during the period of time that the user is logged into the server. For a mobile user device, the heatmap logic circuitry in an app may request that the user move to different locations within the "home" location and collect heatmaps at each of the locations. Alternatively, the heatmap logic circuitry in an app may continuously collect heatmap data as the user moves around the "home" location to determine a heatmap for the "home" location. Note that the same processes described herein may be implemented at any location from which the user logs into the server and note that the processes may differ depending on the location, on whether the location is public or private, and/or the like.

In some embodiments, the heatmap logic circuitry may log dates, times, months, seasons, and/or the like, during which changes to the heatmaps at a user location occur to detect patterns associated with the changes to the set of network devices, if any. In other embodiments, the heatmap logic circuitry in the app may generate the instantaneous heatmap and periodically update the heatmap for the "home" location, to update the heatmap for the "home" location with the changes to the set of network devices. In some embodiments, the heatmap logic circuitry in an app may comprise instructions or commands sent from the heatmap logic circuitry in the server and executed by an Internet browser or other app on the user device.

The app may determine a set of network devices via passive collection activities and/or active collection activities, based on wired network connections and/or wireless communications. In some embodiments, the app may passively collect and/or actively collect communications from one or more network devices on one or more carrier frequencies such as 2.4 GHz, 5 GHZ, 45 GHZ, and/or 60 GHz, and/or from devices connected to a wired network such as an Ethernet network, fiber optic network, and/or the like. After collecting a set of network devices and, optionally, information related to the network devices and/or information related to communications to/from the network devices, the app may create a heatmap that includes the set of network devices to send to the server for storage in a user database.

In many embodiments, the heatmap may include a device ID for each device in the set of network devices. In some embodiments, the heatmap may include a type of network, a frequency of a signal, a basic service set identifier (BSSID), a service set identifier (SSID), other advertisement information associated with a network identifier, a combination thereof, and/or the like. In some embodiments, the heatmap may include a signal strength value and/or quality value such as a received signal strength indicator (RSSI) value, a signal-to-noise ratio (SNR), a received signal-to-noise indicator (RSNI), a signal quality (SQ), a received channel power indicator (RCPI), a received power indicator (RPI), an average noise plus interference power (ANPI), and/or other value indicative of the strength and/or quality of the signal received wirelessly from a network device. In some embodiments, the heatmap may include a location ID such as coordinates, an Internet protocol (IP) address, a label provided by the user, another value indicative of the geographical location of the user, and/or the like. In some embodiments, the heatmap may include other parameters, or information, related to the network devices or communications to/from the network devices such as a beacon interval, capability information, a service set identifier, an enhanced distributed channel access (EDCA) parameter set, a quality-of-service (QOS) capability, high throughput (HT) capabilities, very high throughput (VHT) capabilities, a mesh ID, a neighbor report indicative neighbor network devices, and/or the like.

The set of network devices may comprise one or more different types of devices based on the capabilities of the user device. For instance, the set of network devices may comprise Wi-Fi devices, Bluetooth devices, cellular devices, amplitude modulation/frequency modulation (AM/FM) devices, near field communication (NFC) devices, radio-frequency identifier (RFID) devices and/or tags, other devices that may transmit communications via wireless or wired communications media, and/or the like. The set of network devices may comprise tuners, amplifiers, speakers, watches, exercise equipment, tablets, laptop/notebook computers, desktop computers, server computers, wireless keyboards, wireless mouse/trackball, wireless light fixtures, routers, gateways, hubs, printers, scanners, copiers, phones, light switches, smoke detectors, carbon monoxide (CO) detectors, other wireless sensors, air conditioner controllers, air conditioners, cell phones, smart phones, and/or the like.

After generating one or more heatmaps for the location, the heatmap logic circuitry of the app may transmit or cause the one or more heatmaps to be transmitted or sent to the heatmap logic circuitry of the server. The heatmap logic circuitry of the server may receive the one or more heatmaps and store the one or more heatmaps in heatmap data structure(s) of a user database associated with a user profile (element 3015). The user database may comprise one or more user heatmaps stored in the same or similar heatmap data structures. In some embodiments, a user profile may maintain one or more bits associated with the locations or location identifiers of the heatmaps stored in the user heatmaps to offer the user the option to enable or disable heatmap locations.

After a heatmap is created for a location and the user attempts to log into the server from that location, the heatmap logic circuitry may automatically, or in response to a prompt from the heatmap logic circuitry of the server, generate a heatmap for the user's location and transmit the heatmap along with the user's login credentials to log into the server (element 3020). For example, the heatmap logic circuitry of the app may maintain an indication of the locations from which heatmaps were generated for a user and during a login attempt by the user, the heatmap logic circuitry of the app may create a heatmap for the current location and send the heatmap with the login credentials. In other embodiments, the heatmap logic circuitry of the app may, before, during, or after transmitting the login credentials; receive an indication from the heatmap logic circuitry of the server to send a heatmap for the location. For instance, at the time the user opens the app, the heatmap logic circuitry of the app may connect with the server and the heatmap logic circuitry of the server may transmit an indication that the heatmap should be created and sent along with the login credentials or after transmission of the login credentials.

After receipt of the user login credentials and the heatmap for the location of the user, the server may authenticate the credentials and the heatmap logic circuitry of the server may compare or correlate the heatmap received for the user location against a heatmap stored in the user database for that user location. In many embodiments, the heatmap logic circuitry of the server may generate a score based on the comparison or correlation of the heatmap received with the login attempt and the heatmap stored in the user database (element 3025). The score may be a probability of a match, a value indicative of a similarity between the heatmaps, a value indicative of a difference between the heatmaps, a combination thereof, and/or the like.

In some embodiments, the heatmap logic circuitry of the server may generate the score via one or more mathematical operations, via a statistical model, via a machine learning model or engine, a combination thereof, and/or the like. In some embodiments, the heatmap logic circuitry of the server may generate the score via one or more mathematical operations that include weights for various aspects of the heatmaps. For instance, the one or more mathematical operations may place more weight on the presence or absence of a network device in the set of network devices than small changes, such as plus or minus 10% or 20%, in the value indicative of the signal strength from the network devices. In some embodiments, the user may move about the location to capture a range of signal strength values for each of the network devices in the set of network devices in the heatmap at the time of creating the heatmap for the location and/or at the time of a login attempt to the server, and the score may be based on the correlation of the range of values for the signal strength or quality to the values stored for the heatmap in the user database for the server.

Once the heatmap logic circuitry of the server determines the score for the heatmap received from the user for a login attempt to the server, the heatmap logic circuitry may determine to authenticate the login attempt based on the score (element 3030). In some embodiments, the score along with the login credentials may determine whether the user may log into the server and/or may determine a level of access or authorization that the user has upon logging into the server. For instance, the user may have complete access to server operations such a bank account management and transactions if the login credentials match and the score indicates a match or matches the heatmap stored in the user database within an acceptable tolerance. An acceptable tolerance may be, e.g., a 90% or a 95% probability of a match, a 5% or a 10% deviation indication by the score. If the score indicates an 80% match, for example, the server may allow the user to access the account to view statements but may restrict the use of bill payment transactions, other currency transactions, and/or account management functionality.

In some embodiments, the score may comprise one of multiple factors considered by the heatmap logic circuitry of the server along with the login credentials to determine whether the user may log into the server and/or to determine a level of access or authorization that the user has upon logging into the server. For instance, the server may request additional information from the user such as answers to one or more security questions, verify access to OOB communications (e.g., a verification code communicated by voice to a phone on record, via text to a mobile phone via a cellular texting system, via email, and/or the like), request provision of a token issued to the user, a combination thereof, and/or the like.

In some embodiments, the heatmap logic circuitry of the server may require additional security factors if the user requests access to perform operations that require higher levels of access to the server either at the time the user logs into the server or at the time that user attempts to perform operations that require higher levels of access or authorization.

FIG. 3B illustrates a flowchart of a process 3100 to determine a heatmap to authenticate a user via the heatmap. The process 3100 begins with receiving, by a user device, a list of network devices and/or actively transmitting one or more frames to request device information to generate a set of network devices (element 3110). In some embodiments, heatmap logic circuitry may prompt the user to help to build a heatmap for a location. For instance, the heatmap logic circuitry of a server and/or of an app configured for accessing the server may prompt the user to identify a location as a location from which the user may subsequently and/or repeatedly access a user account. The heatmap logic circuitry may ask the user to confirm that the user device upon which the heatmap logic is being executed, is a user device from which the user may subsequently and/or repeatedly access a user account. The heatmap logic circuitry may facilitate the capture of one or more heatmap parameters for the location via the user device. In some embodiments, the heatmap logic circuitry may ask the user to move to different locations about the area with the user device (if the user device is mobile) that the user expects to log into the account to capture heatmap parameters at each of the different locations.

In some embodiments, the heatmap logic circuitry may passively receive wireless signals at the location via the user device to generate a heatmap. In such embodiments, the heatmap logic circuitry may determine the signal strength and capture an identification from each of the signals of the source of the signals. For instance, the heatmap logic circuitry may detect a communication from or to a Wi-Fi access point, a Bluetooth device, a cellular device, a cellular tower, an NFC device, a RFID device, an AM and/or FM radio station, and/or the like. After detection of the communication, the heatmap logic circuitry may capture an ID of the source of the transmission from the communication, an ID of a recipient of the communications, other device IDs within the communication such as an ID of a relay device, and/or identify a type of communication.

In some embodiments, the heatmap logic circuitry may capture more information from the communications such as additional information included in one or more of the frames received from a device. For example, a wireless access point may transmit a beacon frame periodically and the heatmap logic circuitry may capture the periodicity or beacon interval, a service set identifier (SSID), capabilities, advertisement protocols, a mesh configuration, a frequency of the transmission, other parameters provided in the beacon frame, and/or the like of the beacon frames for the wireless access point as heatmap parameters. In further embodiments, the heatmap logic circuitry may capture other communications such as communications that advertise services, capabilities, and/or the like of a device coupled with a network within communications range of the user device.

In some embodiments, the heatmap logic circuitry may actively cause transmission of probe requests, service requests for services, other requests, and/or the like from the location via the user device and capture communications such as beacon frames and/or other advertisement frames from one or more devices responding to the requests. For example, the heatmap logic circuitry may cause transmission of a probe request frame with a request for a neighbor report and the access point may respond with, e.g., a probe response frame comprising a neighbor report. The heatmap logic circuitry may capture heatmap parameters from the neighbor report including, for instance, other neighbor access points as network devices in the set of network devices and parameters about the other access points. The neighbor report, for instance, may advertise services, capabilities, beacon intervals, and/or the like of the neighbor devices. In some embodiments, the heatmap logic circuitry may actively cause transmission of probe requests and/or other requests from the location via the user device to each of the neighbor access points and capture heatmap parameters from responses to the probe requests and/or other requests.

In some embodiments, the heatmap logic circuitry may capture information about wireless signals at a location. In some embodiments, the heatmap logic circuitry may capture information about wired connections either wired directly to the user device or wired to wireless devices wirelessly associated with the user device such as accessories directly attached to the user device and/or networked devices coupled with the user device via a wired network connection.

After receiving information at or about the location of the user device, the heatmap logic circuitry may determine one or more parameters associated with each device in the set of network devices (element 3115). For instance, the heatmap logic circuitry may determine and/or capture device IDs from each of the network devices, signal strengths from each of the wireless devices, other parameters from each of the devices, and/or the like.

In many embodiments, the heatmap logic circuitry may generate a frame comprising the set of network devices (element 3120). In some embodiments, the heatmap logic circuitry may encrypt, compress, or otherwise encode the set of network devices along with the parameters determined for the network devices at the location of the user device to include in the frame for transmission to the heatmap logic circuitry of the server.

In some embodiments, the heatmap logic circuitry may transmit or cause transmission of the frame along with other authentication information from the user device to the server to log into the server (element 3125). In some embodiments, the heatmap logic circuitry may transmit or cause transmission of the frame along with other authentication information including login credentials to log into the server to authenticate the information provided to the server. In some embodiment, the heatmap logic circuitry may transmit or cause transmission of the frame with the heatmap parameters after the user logs into an account serviced by or otherwise associated with the server.

Figure 4:
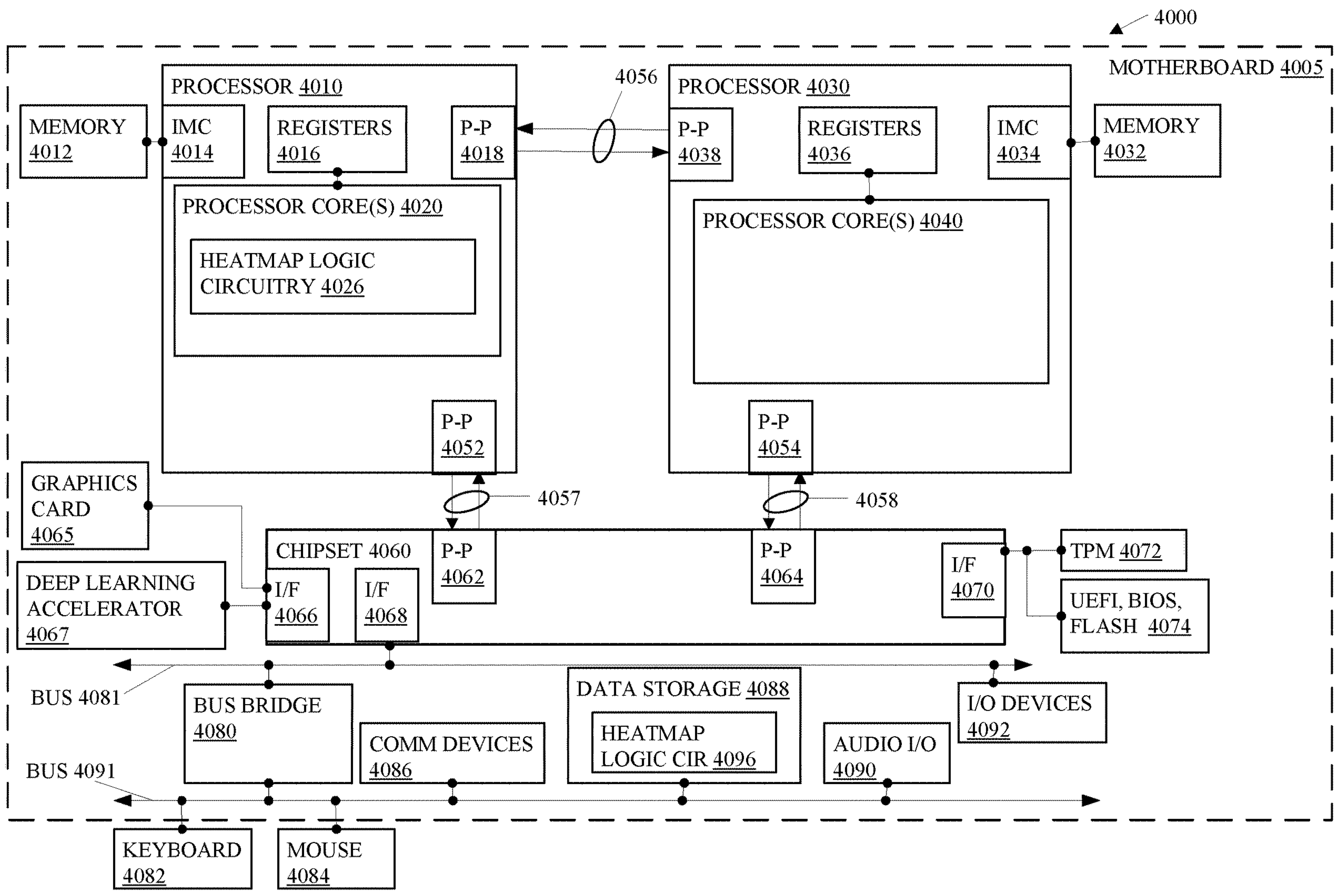
FIG. 4 depicts an embodiment of a system including a multiple-processor platform, a chipset, buses, and accessories such as the server and apparatus shown in FIGS. 1A and 2A-B.

FIG. 4 illustrates an embodiment of a system 4000 such as a server of the server(s) 1010 shown in FIG. 1A, data server(s) 1050 shown in FIG. 1A, the apparatus 2000 shown in FIG. 2A, or the apparatus 2100 shown in FIG. 2B. The system 4000 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 4000 may have a single processor with one core or more than one processor. Note that the term "processor" refers to a processor with a single core or a processor package with multiple processor cores.

As shown in FIG. 4, system 4000 comprises a motherboard 4005 for mounting platform components. The motherboard 4005 is a point-to-point interconnect platform that includes a first processor 4010 and a second processor 4030 coupled via a point-to-point interconnect 4056 such as an Ultra Path Interconnect (UPI). In other embodiments, the system 4000 may be of another bus architecture, such as a multi-drop bus. Furthermore, each of processors 4010 and 4030 may be processor packages with multiple processor cores including processor core(s) 4020 and 4040, respectively. While the system 4000 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processors 4010 and the chipset 4060. Some platforms may include additional components and some platforms may only include sockets to mount the processors and/or the chipset.

The first processor 4010 includes an integrated memory controller (IMC) 4014 and point-to-point (P-P) interconnects 4018 and 4052. Similarly, the second processor 4030 includes an IMC 4034 and P-P interconnects 4038 and 4054. The IMC's 4014 and 4034 couple the processors 4010 and 4030, respectively, to respective memories, a memory 4012 and a memory 4032. The memories 4012 and 4032 may be portions of the main memory (e.g., a dynamic random-access memory (DRAM)) for the platform such as double data rate type 3 (DDR3) or type 4 (DDR4) synchronous DRAM (SDRAM). In the present embodiment, the memories 4012 and 4032 locally attach to the respective processors 4010 and 4030. In other embodiments, the main memory may couple with the processors via a bus and shared memory hub.

The processors 4010 and 4030 comprise caches coupled with each of the processor core(s) 4020 and 4040, respectively. In the present embodiment, the processor core(s) 4020 of the processor 4010 include a heatmap logic circuitry 4026 such as the heatmap logic circuitry 1012 or 1082 shown in FIG. 1A, the heatmap logic circuitry 2020 in FIG. 2A, and/or the heatmap logic circuitry 2120 shown in FIG. 2B. The heatmap logic circuitry 4026 may represent circuitry configured to determine a heatmap and/or authenticate a user via the heatmap within the processor core(s) 4020 or may represent a combination of the circuitry within a processor and a medium to store all or part of the functionality of the heatmap logic circuitry 4026 in memory such as cache, the memory 4012, buffers, registers, and/or the like. In several embodiments, the functionality of the heatmap logic circuitry 4026 resides in whole or in part as code in a memory such as the heatmap logic circuitry 4096 in the data storage unit 4088 attached to the processor 4010 via a chipset 4060 such as the heatmap logic circuitries 2020 and 2032 shown in FIG. 2A. The functionality of the heatmap logic circuitry 4026 may also reside in whole or in part in memory such as the memory 4012 and/or a cache of the processor. Furthermore, the functionality of the heatmap logic circuitry 4026 may also reside in whole or in part as circuitry within the processor 4010 and may perform operations, e.g., within registers or buffers such as the registers 4016 within the processor 4010, registers 4036 within the processor 4030, or within an instruction pipeline of the processor 4010 or the processor 4030.

In other embodiments, more than one of the processors 4010 and 4030 may comprise functionality of the heatmap logic circuitry 4026 such as the processor 4030 and/or the processor within the deep learning accelerator 4067 coupled with the chipset 4060 via an interface (I/F) 4066. The I/F 4066 may be, for example, a Peripheral Component Interconnect-enhanced (PCI-e).

The first processor 4010 couples to a chipset 4060 via P-P interconnects 4052 and 4062 and the second processor 4030 couples to a chipset 4060 via P-P interconnects 4054 and 4064. Direct Media Interfaces (DMIs) 4057 and 4058 may couple the P-P interconnects 4052 and 4062 and the P-P interconnects 4054 and 4064, respectively. The DMI may be a high-speed interconnect that facilitates, e.g., eight Giga Transfers per second (GT/s) such as DMI 3.0. In other embodiments, the processors 4010 and 4030 may interconnect via a bus.

The chipset 4060 may comprise a controller hub such as a platform controller hub (PCH). The chipset 4060 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 4060 may comprise more than one controller hub such as a chipset with a memory controller hub, a graphics controller hub, and an input/output (I/O) controller hub.

In the present embodiment, the chipset 4060 couples with a trusted platform module (TPM) 4072 and the unified extensible firmware interface (UEFI), BIOS, Flash component 4074 via an interface (I/F) 4070. The TPM 4072 is a dedicated microcontroller designed to secure hardware by integrating cryptographic keys into devices. The UEFI, BIOS, Flash component 4074 may provide pre-boot code.

Furthermore, chipset 4060 includes an I/F 4066 to couple chipset 4060 with a high-performance graphics engine, graphics card 4065. In other embodiments, the system 4000 may include a flexible display interface (FDI) between the processors 4010 and 4030 and the chipset 4060. The FDI interconnects a graphics processor core in a processor with the chipset 4060.

Various I/O devices 4092 couple to the bus 4081, along with a bus bridge 4080 which couples the bus 4081 to a second bus 4091 and an I/F 4068 that connects the bus 4081 with the chipset 4060. In one embodiment, the second bus 4091 may be a low pin count (LPC) bus. Various devices may couple to the second bus 4091 including, for example, a keyboard 4082, a mouse 4084, communication devices 4086 and a data storage unit 4088 that may store code such as the heatmap logic circuitry 4096. Furthermore, an audio I/O 4090 may couple to second bus 4091. Many of the I/O devices 4092, communication devices 4086, and the data storage unit 4088 may reside on the motherboard 4005 while the keyboard 4082 and the mouse 4084 may be add-on peripherals. In other embodiments, some or all the I/O devices 4092, communication devices 4086, and the data storage unit 4088 are add-on peripherals and do not reside on the motherboard 4005.

Figures 5, 6:
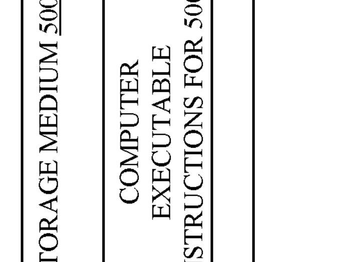
FIGS. 5-6 depict embodiments of a storage medium and a computing platform such as the server(s) and the apparatus shown in FIGS. 1A and 2A-B.

FIG. 5 illustrates an example of a storage medium 5000 to determine a heatmap and authenticate a user via the heatmap. Storage medium 5000 may comprise an article of manufacture. In some examples, storage medium 5000 may include any non-transitory computer readable medium or machine readable medium, such as an optical, magnetic or semiconductor storage. Storage medium 5000 may store various types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

FIG. 6 illustrates an example computing platform 6000. In some examples, as shown in FIG. 6, computing platform 6000 may include a processing component 6010, other platform components or a communications interface 6030. According to some examples, computing platform 6000 may be implemented in a computing device such as a server in a system such as a data center or server farm that supports a manager or controller for managing configurable computing resources. Furthermore, the communications interface 6030 may comprise a wake-up radio (WUR) and may be capable of waking up a main radio of the computing platform 6000.

According to some examples, processing component 6010 may execute processing operations or logic for apparatus 6015 described herein such as the heatmap logic circuitry 1012, 1084, 2020, 2031, 2120, and 2132 illustrated in FIGS. 1A and 2A-2B, respectively. Processing component 6010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 6020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given example.

In some examples, other platform components 6025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory), solid state drives (SSD) and any other type of storage media suitable for storing information.

In some examples, communications interface 6030 may include logic and/or features to support a communication interface. For these examples, communications interface 6030 may include one or more communication interfaces that operate according to various communication protocols or standards to communicate over direct or network communication links. Direct communications may occur via use of communication protocols or standards described in one or more industry standards (including progenies and variants) such as those associated with the PCI Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 6000 may be part of a computing device that may be, for example, a server, a server array or server farm, a web server, a network server, an Internet server, a workstation, a mini-computer, a main frame computer, a supercomputer, a network appliance, a web appliance, a distributed computing system, multiprocessor systems, processor-based systems, or combination thereof. Accordingly, functions and/or specific configurations of computing platform 6000 described herein, may be included or omitted in various embodiments of computing platform 6000, as suitably desired.

The components and features of computing platform 6000 may be implemented using any combination of discrete circuitry, ASICs, logic gates and/or single chip architectures. Further, the features of computing platform 6000 may be implemented using microcontrollers, programmable logic arrays and/or microprocessors or any combination of the foregoing where suitably appropriate. It is noted that hardware, firmware and/or software elements may be collectively or individually referred to herein as "logic".

It should be appreciated that the computing platform 6000 shown in the block diagram of FIG. 6 may represent one functionally descriptive example of many potential implementations. Accordingly, division, omission or inclusion of block functions depicted in the accompanying figures does not infer that the hardware components, circuits, software and/or elements for implementing these functions would necessarily be divided, omitted, or included in embodiments.

One or more aspects of at least one example may be implemented by representative instructions stored on at least one machine-readable medium which represents various logic within the processor, which when read by a machine, computing device or system causes the machine, computing device or system to fabricate logic to perform the techniques described herein. Such representations, known as "IP cores", may be stored on a tangible, machine readable medium and supplied to various customers or manufacturing facilities to load into the fabrication machines that actually make the logic or processor.

Various examples may be implemented using hardware elements, software elements, or a combination of both. In some examples, hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. In some examples, software elements may include software components, programs, applications, computer programs, application programs, system programs, machine programs, operating system software, middleware, firmware, software modules, routines, subroutines, functions, methods, procedures, software interfaces, application program interfaces (APIs), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, APIs, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "in one example" or "an example" along with their derivatives. These terms mean that a particular feature, structure, or characteristic described in connection with the example is included in at least one example. The appearances of the phrase "in one example" in various places in the specification are not necessarily all referring to the same example.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code to reduce the number of times code must be retrieved from bulk storage during execution. The term "code" covers a broad range of software components and constructs, including applications, drivers, processes, routines, methods, modules, firmware, microcode, and subprograms. Thus, the term "code" may be used to refer to any collection of instructions which, when executed by a processing system, perform a desired operation or operations.

Logic circuitry, devices, and interfaces herein described may perform functions implemented in hardware and also implemented with code executed on one or more processors. Logic circuitry refers to the hardware or the hardware and code that implements one or more logical functions. Circuitry is hardware and may refer to one or more circuits. Each circuit may perform a particular function. A circuit of the circuitry may comprise discrete electrical components interconnected with one or more conductors, an integrated circuit, a chip package, a chip set, memory, or the like. Integrated circuits include circuits created on a substrate such as a silicon wafer and may comprise components. And integrated circuits, processor packages, chip packages, and chipsets may comprise one or more processors.

Processors may receive signals such as instructions and/or data at the input(s) and process the signals to generate the at least one output. While executing code, the code changes the physical states and characteristics of transistors that make up a processor pipeline. The physical states of the transistors translate into logical bits of ones and zeros stored in registers within the processor. The processor can transfer the physical states of the transistors into registers and transfer the physical states of the transistors to another storage medium.

A processor may comprise circuits to perform one or more sub-functions implemented to perform the overall function of the processor. One example of a processor is a state machine or an application-specific integrated circuit (ASIC) that includes at least one input and at least one output. A state machine may manipulate the at least one input to generate the at least one output by performing a predetermined series of serial and/or parallel manipulations or transformations on the at least one input.

The logic as described above may be part of the design for an integrated circuit chip. The chip design is created in a graphical computer programming language and stored in a computer storage medium or data storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly. The stored design is then converted into the appropriate format (e.g., GDSII) for the fabrication.

The resulting integrated circuit chips can be distributed by the fabricator in raw wafer form (that is, as a single wafer that has multiple unpackaged chips), as a bare die, or in a packaged form. In the latter case, the chip is mounted in a single chip package (such as a plastic carrier, with leads that are affixed to a motherboard or other higher-level carrier) or in a multichip package (such as a ceramic carrier that has either or both surface interconnections or buried interconnections). In any case, the chip is then integrated with other chips, discrete circuit elements, and/or other signal processing devices as part of either (a) an intermediate product, such as a processor board, a server platform, or a motherboard, or (b) an end product.

What is claimed is:

1. An apparatus comprising:

memory; and logic circuitry coupled with the memory to:

receive one or more heatmaps captured by one or more user devices associated with a user, wherein a first heatmap of the one or more heatmaps comprises a beacon interval, capability information, an enhanced distributed channel access (EDCA) parameter set, a quality-of-service (QoS) capability, high throughput (HT) capabilities, very high throughput (VHT) capabilities, a mesh ID, a neighbor report indicative neighbor network devices received in a communication from an access point, or a combination thereof, related to wireless communications;

store the one or more heatmaps in a heatmap data structure associated with a user profile for the user;

receive a login attempt comprising a heatmap, the login attempt associated with the user;

generate a score for the login attempt by comparison of the heatmap with the one or more heatmaps stored in the heatmap data structure associated with the user profile for the user; and determine to authenticate the login attempt based on the score.

2. The apparatus of claim 1, the logic circuitry to further capture location information associated with at least one of the one or more heatmaps.

3. The apparatus of claim 1, the logic circuitry to generate the score with a machine learning model.

4. The apparatus of claim 1, the logic circuitry to generate the score with a mathematical correlation model.

5. The apparatus of claim 1, the one or more heatmaps to comprise a list of network identifiers and a signal strength associated with each of the network identifiers.

6. The apparatus of claim 1, the one or more heatmaps to comprise a list of network identifiers and additional information associated with each of the network identifiers, wherein the additional information comprises a type of network, a frequency of a signal, other advertisement information associated with a network identifier, or a combination thereof.

7. The apparatus of claim 1, the one or more heatmaps to comprise a list of network identifiers and additional information associated with each of the network identifiers, wherein the additional information comprises one or more values characterizing a signal received wirelessly from a network device including a received signal strength indicator (RSSI) value, a signal-to-noise ratio (SNR), a received signal-to-noise indicator (RSNI), a signal quality (SQ), a received channel power indicator (RCPI), a received power indicator (RPI), an average noise plus interference power (ANPI), or a combination thereof.

8. The apparatus of claim 1, wherein the score comprises a probability that the login attempt is by the user.

9. A non-transitory storage medium containing instructions, which when executed by a processor, cause the processor to perform operations, the operations to:

receive a first heatmap from a first user device associated with a user location, wherein the first heatmap comprises information about accessories wired to other devices that are wirelessly connected to the first user device at the user location;

store the first heatmap in a heatmap data structure associated with a user profile for the user location;

receive, from a second user device, a login attempt comprising a second heatmap, the login attempt associated with the user location;

filter the first heatmap based on wireless communication capabilities of the second user device to create a filtered first heatmap;

correlate the second heatmap with the filtered first heatmap associated with the user profile to generate a score for the login attempt; and authenticate the login attempt based on the score.

10. The non-transitory storage medium of claim 9, wherein the operations further comprise operations to capture location information associated with the first heatmap.

11. The non-transitory storage medium of claim 9, wherein the operations further comprise operations to generate the score with a machine learning model.

12. The non-transitory storage medium of claim 9, wherein the operations further comprise operations to generate the score with a mathematical correlation model.

13. The non-transitory storage medium of claim 9, the first heatmap to comprise a list of network identifiers and a signal strength associated with each of the network identifiers.

14. The non-transitory storage medium of claim 9, the first heatmap to comprise a list of network identifiers and additional information associated with each of the network identifiers, wherein the additional information comprises a beacon interval, an enhanced distributed channel access (EDCA) parameter set, a quality-of-service (QoS) capability, high throughput (HT) capabilities, very high throughput (VHT) capabilities, a mesh ID, a neighbor report indicative neighbor network devices, or a combination thereof.

15. The non-transitory storage medium of claim 9, the first heatmap to comprise a list of network identifiers and additional information associated with each of the network identifiers, wherein the additional information comprises a received signal strength indicator (RSSI) value, a signal-to-noise ratio (SNR), a received signal-to-noise indicator (RSNI), a signal quality (SQ), a received channel power indicator (RCPI), a received power indicator (RPI), an average noise plus interference power (ANPI), or a combination thereof.

16. The non-transitory storage medium of claim 9, wherein the operations further comprise operations to lookup the first and second heatmaps based on location information associated with the login attempt.

17. A method comprising:

receiving one or more heatmaps captured by one or more user devices associated with a user location, wherein a first heatmap of the one or more heatmaps comprises a received signal strength indicator (RSSI) value, a signal-to-noise ratio (SNR), a received signal-to-noise indicator (RSNI), a received channel power indicator (RCPI), a received power indicator (RPI), an average noise plus interference power (ANPI), or a combination thereof, related to wireless communications for the user location;

storing the one or more heatmaps in a heatmap data structure associated with a user profile for the user location;

receiving, from a first user device of the one or more user devices, a login attempt comprising a heatmap, the login attempt associated with the user location;

generating a score for the login attempt by comparison of the heatmap with a first heatmap of the one or more heatmaps, captured by a second user device of the one or more user devices for the user location, wherein generation of the score accounts for different wireless communication capabilities of the first user device and the second user device; and determining to authenticate the login attempt based on the score.

18. The method of claim 17, further comprising capturing location information associated with at least one of the one or more heatmaps.

19. The method of claim 17, further comprising generating the score with a machine learning model or a correlation model.

20. The method of claim 17, the one or more heatmaps to comprise a list of network identifiers and additional information comprising a type of network, a frequency of a signal, a beacon interval, capability information, an enhanced distributed channel access (EDCA) parameter set, a quality-of-service (QoS) capability, high throughput (HT) capabilities, very high throughput (VHT) capabilities, a mesh ID, a neighbor report indicative neighbor network devices, or a combination thereof.

* * * * *